(12) United States Patent
Cuppari

(10) Patent No.: US 11,866,316 B2
(45) Date of Patent: Jan. 9, 2024

(54) SYSTEM AND METHOD FOR TRACKING DISPENSED PRODUCTS AT PARTICIPATING CUSTOMER LOCATIONS

(71) Applicant: The Coca-Cola Company, Atlanta, GA (US)

(72) Inventor: Scott Cuppari, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 17/963,873

(22) Filed: Oct. 11, 2022

(65) Prior Publication Data

US 2023/0032831 A1 Feb. 2, 2023

Related U.S. Application Data

(63) Continuation of application No. 17/157,757, filed on Jan. 25, 2021, now Pat. No. 11,465,896, which is a
(Continued)

(51) Int. Cl.
 *B67D 1/08* (2006.01)
 *G06Q 30/0201* (2023.01)
 *G07F 13/06* (2006.01)

(52) U.S. Cl.
 CPC ....... *B67D 1/0881* (2013.01); *G06Q 30/0201* (2013.01); *G07F 13/065* (2013.01)

(58) Field of Classification Search
 CPC .......................... G07Q 30/0201; G07F 13/065
 See application file for complete search history.

(56) References Cited

U.S. PATENT DOCUMENTS 8,880,427 B1 11/2014 Jones
10,899,595 B2 * 1/2021 Cuppari ............... G06Q 20/322
(Continued)

FOREIGN PATENT DOCUMENTS

CN 1342302 A 3/2002
CN 103003190 A 3/2013
(Continued)

OTHER PUBLICATIONS

International Search Report and Written Opinion corresponding to PCT/US2017/068629, dated Apr. 23, 2018, 14 pgs.

*Primary Examiner* — Jason K Niesz
(74) *Attorney, Agent, or Firm* — Foley & Lardner LLP

(57) ABSTRACT

A system and method a method may include receiving (i) beverage composition data of a requested beverage, and (ii) a user identifier of a user requesting the beverage. Responsive to receiving an instruction to dispense the requested beverage, the requested beverage may be dispensed. The beverage composition data may be stored in a dispensed beverage data record. A verification as to whether or not the dispensed beverage is a qualified beverage pour may be performed. Responsive to determining that the dispensed beverage is a qualified beverage pour, a counter may be increased. Responsive to determining that the counter value crosses a threshold value, a first message may be communicated to a mobile electronic device of the user, otherwise, a second message may be communicated to the mobile electronic device. The first or second message may be displayed on the mobile electronic device.

20 Claims, 15 Drawing Sheets

Related U.S. Application Data continuation of application No. 16/472,631, filed as application No. PCT/US2017/068629 on Dec. 28, 2017, now Pat. No. 10,899,595.

(60) Provisional application No. 62/440,995, filed on Dec. 30, 2016.

(56) References Cited

U.S. PATENT DOCUMENTS

| | | |
|---|---|---|
| 2009/0070234 A1 | 3/2009 | Peters et al. |
| 2010/0191369 A1 | 7/2010 | Kim |
| 2014/0108108 A1* | 4/2014 | Artman ................ G06Q 20/322 705/14.1 |
| 2015/0251891 A1* | 9/2015 | Peters .................. B67D 1/0888 222/129.1 |

FOREIGN PATENT DOCUMENTS

| WO | WO-2013/150091 A1 | 10/2013 |
|---|---|---|
| WO | WO-2015/017559 A1 | 2/2015 |

* cited by examiner

SYSTEM AND METHOD FOR TRACKING DISPENSED PRODUCTS AT PARTICIPATING CUSTOMER LOCATIONS

REFERENCE TO RELATED APPLICATION

This application is a continuation of U.S. patent application Ser. No. 17/157,757, filed on Jan. 25, 2021, which is a continuation of U.S. patent application Ser. No. 16/472,631, filed on Jun. 21, 2019, which is a continuation of 371 National Phase Application that claims the benefit of International Patent Application No. PCT/US/2017/068629, filed Dec. 28, 2017, which claims the benefit of U.S. Provisional Application No. 62/440,995, filed Dec. 30, 2016, the contents of which are herein incorporated by reference in their entirety.

BACKGROUND

Consumers of soft drinks from dispensers at food outlets, such as restaurants, movie theaters, and other venues, may utilize beverage dispensers to dispense beverages inclusive of beverage ingredients, such as beverage brands and flavors. The beverages may be customized beverages (e.g., beverages with multiple ingredients blended together by the dispensers) as created by a consumer, food outlet, or otherwise. To encourage consumers to utilize the beverage dispensers more often, a mobile app that is executed by mobile devices of consumers may be utilized to control dispensers to produce traditional or customized beverages, thereby providing the consumers with a more interactive experience.

Beverage ingredient manufacturers desire additional uses by consumers over the course of a month and year to increase product sales over an extended period of time. The creation of the mobile app that enable consumers to create customized beverage blends helps consumer engagement and consumption of beverage ingredients available at dispensers, but, of course, more frequent and extensive engagement is desired by the manufacturers and distributors of the beverage ingredients.

SUMMARY

To increase consumer engagement, extended, and repeated usage of beverage dispensers, a system may be configured to track qualified beverage dispenses by beverage dispensers at food outlets. In an embodiment, a verification may be performed by detecting qualified beverage pours usage by a user of a mobile app or other electronic device (e.g., dispenser, kiosk, remote user interface, etc.) of at a dispenser that the beverage pour is a qualified beverage pour, and recording that the beverage pour was a qualified beverage pour. A qualified beverage pour counter may be increased to track how many qualified beverage pours the customer has performed over a given time period. A qualified beverage pour may include a wide range of beverage dispensing options, such as the user using the mobile app to dispense a blended beverage, such as a customized blended beverage created by the user. More specifically, different values may be applied to different uses of the dispenser, such as blending more than two ingredients, creating different blends, and so on. In verifying a qualified beverage pour, a user ID, specific beverage poured, geographic location of dispenser, dispenser ID, food outlet ID, food outlet location, and/or other data may be collected and processed. The qualified beverage pour, thus, may be based on the specific beverage that was dispensed, specific location (e.g., food outlet), frequency of use by the user, time of day, and so on.

Based on the tracking of qualified uses of beverage dispensers, the beverage manufacturer may provide features, such as incentives or rewards, for mobile app usage (or other usage) to generate qualified beverage pours from one or more beverage dispensers. Third-party marketers may also participate to offer rewards with other products. As an example, a food outlet may offer rewards, discounts, or other benefit generating qualified beverage pours via a mobile app or otherwise from a dispenser at the food outlet. Other commercial entities, such as media (e.g., music, film, etc.) distributors may offer incentives (e.g., create and dispense 10 blended beverages, get free song download; create and dispense one large beverage, get online gaming character upgrade, etc.) based on the qualified beverage pour and/or usage of the mobile app in conjunction with a beverage dispenser.

One embodiment of a system may include a beverage dispenser including a non-transitory memory device, an input/output (I/O) unit configured to communicate with a communications network, and a processing unit in communication with the non-transitory memory device and said I/O unit. The processing unit may be configured to receive (i) beverage composition data of a beverage composition of a requested beverage, and (ii) a user identifier of a user requesting the beverage. Responsive to receiving an instruction to dispense the requested beverage associated with the user identifier, the requested beverage including the beverage composition may be caused to be dispensed based on the beverage composition data. The beverage composition data of the dispensed beverage may be stored in a dispensed beverage data record The system may further include a verification server that includes a storage unit configured to store a data repository, an I/O unit configured to communicate with the beverage dispenser over the communications network, and a processing unit may be in communication with the storage unit and I/O unit of the server. The processing unit may be configured to receive from the beverage dispenser a data communication inclusive of the user identifier, dispensed beverage composition data record, and dispenser identifier associated with a dispenser location of the dispenser. The user identifier, dispensed beverage data record, and dispenser identifier may be stored in the data repository. A verification as to whether or not the dispensed beverage is a qualified beverage pour may be made by comparing the dispensed beverage data record to qualified beverage pour criteria. Responsive to determining that the dispensed beverage is a qualified beverage pour, a counter stored in the data repository in association with the user identifier may be increased. Responsive to determining that the counter value crosses a threshold value, a first message may be communicated to a mobile electronic device associated with the user via the communications network. Otherwise, a second message may be communicated to the mobile electronic device via the communications network. The first or second message may cause a user interface being executed and presented by the mobile electronic device to display information representative of the first or second message to the user of the mobile electronic device.

One embodiment of a method may include receiving (i) beverage composition data of a beverage composition of a requested beverage, and (ii) a user identifier of a user requesting the beverage. Responsive to receiving an instruction to dispense the requested beverage associated with the user identifier, dispensing the requested beverage to be dispensed based on the beverage composition data. The beverage composition data of the dispensed beverage may be stored in a dispensed beverage data record. A verification as to whether or not the dispensed beverage is a qualified beverage pour may be performed by comparing the dispensed beverage data record to qualified beverage pour criteria. Responsive to determining that the dispensed beverage is a qualified beverage pour, a counter may be increased. Responsive to determining that the counter value crosses a threshold value, a first message may be communicated to a mobile electronic device associated with the user, otherwise, a second message may be communicated to the mobile electronic device. The first or second message may cause a user interface being executed and presented by the mobile electronic device to display information representative of the first or second message to the user of the mobile electronic device.

BRIEF DESCRIPTION

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1A:
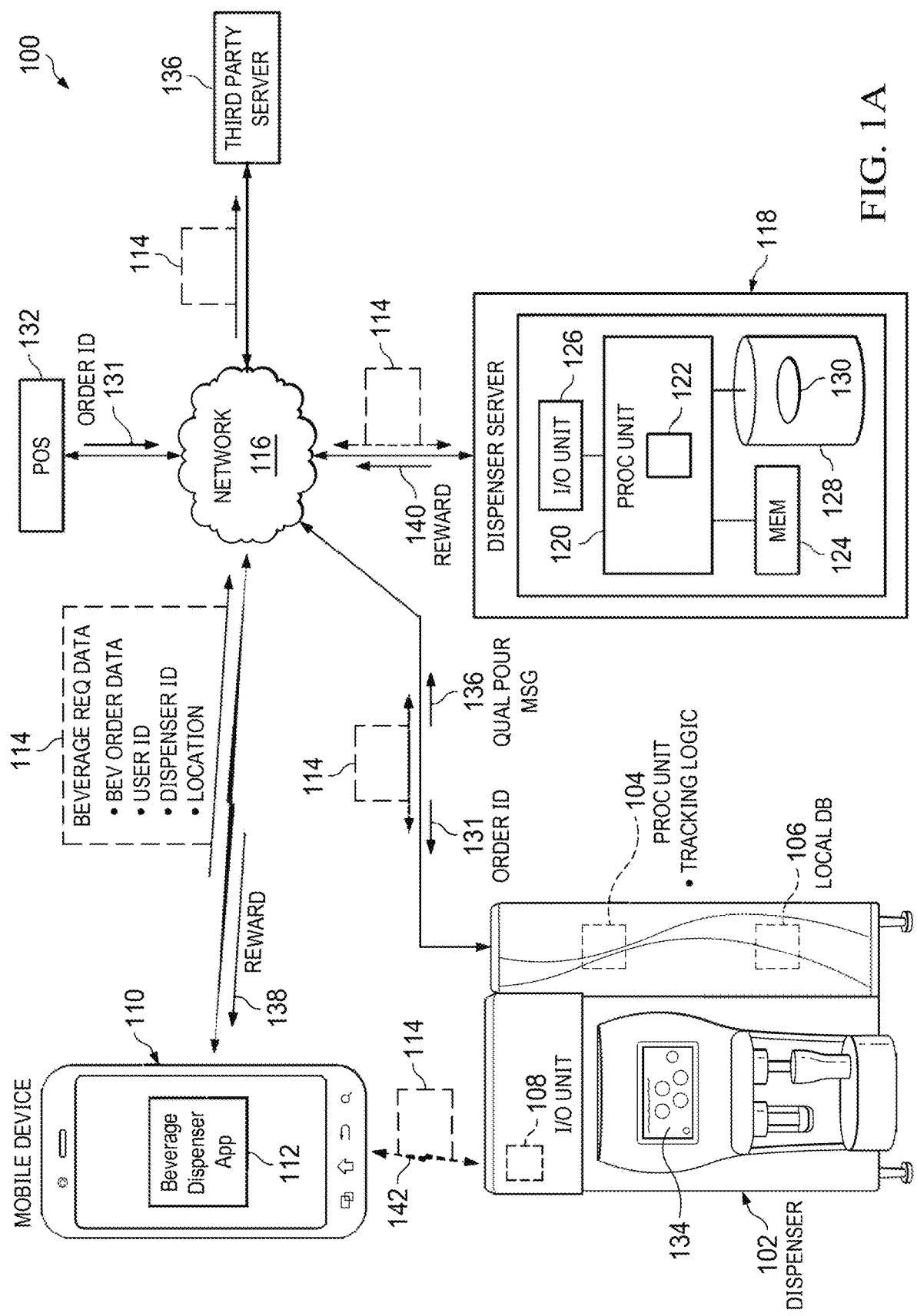
FIG. 1A is an illustration of an illustrative order at a food service outlet at which a beverage dispenser may be configured to be instructed to prepare and dispense beverages.

With regard to FIG. 1A, an illustration of an illustrative dispenser network environment 100 in which a beverage dispenser 102 that may be located at a food service outlet is shown. The food service outlet may be a restaurant, food court, movie theater, or any other establishment at which a beverage dispenser that pours beverage ingredients is located. The beverage dispenser 102 may be configured with a processing unit 104, which may include one or more computer processors, and may be configured to execute software that operates the dispenser 102. The software may also be configured with tracking logic software for tracking usage, including remote access usage via a mobile device of the dispenser 102 and determine whether a beverage pour is a qualified beverage pour, as further described hereinbelow. The dispenser 102 may further include a local database 106 that may be stored on non-transient memory device, such as static RAM or hard disk. The local database may be configured to store interactions with electronic devices of users, operator(s), food outlet(s), or any other organization that has access to the dispenser 102. In an embodiment, the local database 106 is configured to store information associated with users who access the dispenser via a mobile device or otherwise for selecting beverages to be dispensed by the dispenser 102. The dispenser 102 may further include an I/O unit 108 that may enable local (i) wireless communications with mobile devices of users and (ii) wired or wireless communications via a wideband communications network, such as the Internet and/or mobile communications network, with mobile electronic devices and/or computing systems.

As further shown, a mobile electronic device 110 may be configured to execute a beverage dispenser app 112 on a processing unit (not shown) of the mobile electronic device 110. The mobile electronic device 110 may be a smartphone or any other mobile or other electronic device, as understood in the art. The beverage dispenser app 112 may be configured to enable a user of the mobile device 110 to establish an individually identifiable dispensing session with the dispenser 102, as further described in co-pending U.S. Patent Application serial nos. 2015/0039776, PCT/US16/053961, and JP 2015 253333, the contents of which are hereby incorporated by reference in their entirety. In an embodiment, the dispenser 102 may be in communication with the mobile electronic device 110 during a communication session. The dispenser 102 may be configured to engage the mobile electronic device 110 in a manner that the mobile electronic device 110 and/or associated user is personally identifiable. The dispenser 102 may include a machine readable code, such as a QR code, affixed or displayed that the mobile electronic device may scan to enable the mobile electronic device 110 to communicate with a network server or otherwise communicate an identifier associated with the network server to a network server for further usage. The dispenser 102, in an embodiment, may be configured to receive an identifier of the mobile device and/or user (e.g., registered user) from the mobile electronic device 110 via the beverage dispenser app 112 being executed on the mobile electronic device. The dispenser 102 may be configured to collect, store in the local database 106, and/or communicate the identifier(s) of a mobile device and/or user to another electronic device, such as a remote server, as further described herein, that may be configured to manage dispensers and users of the dispensers.

In an embodiment, the dispenser 102 may be configured to individually identify a user of the dispenser 102 by identifying a mobile device associated with the user. The dispenser 102 may track the user's use of the dispenser 102 either through direct interaction with a user interface (e.g., touch screen) of the dispenser 102 or as a result of receiving a beverage order via the dispensers app 112 from the mobile electronic device 110. In the case of the user interacting directly with the dispenser 102 via the user interface, the dispenser 102 may collect and store selection(s) of beverge(s) and amount actually poured, and utilize the collected information in determining whether the user made a qualified beverage pour. In storing the selection(s) of beverage(s) and amount actually poured, the information may be stored in a dispensed beverage data record by the dispenser. Other information, such as brand dispensed, user identifier, location (e.g., geographic or identifier of a food outlet) of the dispenser 102, timestamp, etc., may also be stored. By tracking users who use the dispenser, rewards and/or promotions may be awarded to the users. In an embodiment, the dispenser 102 may provide the user to log in with the dispenser via the user interface by entering a user name and password, for example, so as to enable the user to receive rewards and/or promotions without the use of a mobile device that communicates with the dispenser 102. By individually identifying a user, the user may be tracked across dispenser locations, including within one or across multiple food outlets (e.g., different restaurant brands) so that a regional, nationwide, or global promotion may be supported by a producer of beverages dispensed by the dispenser 102.

The mobile electronic device 110 executing the beverage dispenser app 112 may be configured to collect certain data when the user uses the app 112, and communicate beverage request data 114 via a communications network 116. The beverage request data 114 may include beverage order data, user identifier (ID), dispenser ID, location of the dispenser, and/or any other information that may be used for tracking dispensed beverages, including qualified and unqualified beverage pours, at a participating customer location. The beverage order data may be or otherwise include a beverage code that is representative of ingredient(s) to be included in a dispensed beverage. As an example, a combination of a diet cola and a cherry cola with a 60%/40% blend may be represented with a beverage code of DC60CC40. The beverage order data may also include information of beverage size (e.g., S, M, L) to be dispensed, and, in an embodiment, the beverage code may incorporate the beverage size information with the ingredient(s) (e.g., beverage code: DC60CC40M).

The beverage request data 114 may be communicated to a dispenser server 118 for processing thereat. In an alternative embodiment, the beverage request data 114 may be communicated to the dispenser 102, which may store the beverage request data 114 in the local database 106 for processing and communicate the beverage request data 114 via the communications network 116 to the dispenser server 118. The dispenser server 118 may be configured with a processing unit 120 that executes software 122. The processing unit 120 may be in communication with memory 124, I/O unit 126, and storage unit 128 that stores a data repository 130. The software 122 may be configured to receive and store the beverage request data 114 in the memory 124 and/or data repository 130. In addition, the software 122 may be configured to measure how much beverage is actually poured and store the measured beverage pour in association with data, such as the beverage request data 114, associated with the user. In an embodiment, the beverage dispenser app 112 may also be configured to receive an order ID 131 from a point-of-sale (POS) 132 that is local to the food service outlet or remotely located (e.g., network server). The order ID 131 may be communicated with the beverage request data 114 or independently by the POS 132 to the dispenser server 118 and/or the dispenser 102. The order ID may be displayed by the dispenser 102 on an electronic display 134 so that an operator may know which order the dispensed beverage is to be associated or the user may be able to identify his or her selected beverage from a list in the case of a self-vending dispenser. Rather than using an order ID, the user ID (e.g., name, portion of phone number, submitted ID by user) may be displayed in conjunction with the dispensed beverage (e.g., listing of ingredient(s) of the dispensed beverage). Still yet, the order ID may be a full listing of ingredients of the selected beverage.

In operation, the dispenser server 118 may be configured to communicate at least a portion of the beverage request data 114 to the dispenser 102 for dispensing the beverage being requested. In an embodiment, the beverage request data 114 may include beverage composition data that describes a composition of a beverage being requested. As an example, the beverage composition data may include brand and/or ingredients of the requested beverage. An instruction may be received by the dispenser 102 to cause the requested beverage to be dispensed. Depending on the configuration of the dispenser 102, the instruction may be received via the beverage request data 114 or via a user or operator by direct input at the dispenser 102 (e.g., via a user interface, such as electronic display, push-buttons, etc.)). So as to increase usage of the beverage dispenser app 112 that increases amount of dispensing by the dispenser 102, the user may be able to collect rewards, points, game pieces, game character functionality, status, or any other virtual or physical value.

A determination of a qualified pour may be performed by a rules engine (see FIG. 1B) being executed by or in communication with the dispenser server 118, which may operate as a verification server, as well. It should be understood that the dispenser server 118 may include one or more servers, and that the functionality of supporting the dispenser 102, beverage dispenser app 112, and/or other functionality, such as verification of qualified pours, may be performed on one or more servers. A qualified beverage pour may include any pour that the operator, retailer, or manufacturer has established to meet a certain objective. The qualified beverage pour may be common across all users using the beverage dispenser app 112. Alternatively, the qualified beverage pour may be varied or be customized for each individual user based on demographics, geographies, historical usage, and so on. Still yet, the qualified beverage pour may vary based on geographic location, a specific food outlet at which the dispenser 102 is located, or otherwise. It should be understood that multiple rewards having the same or different qualified beverage pour criteria may be simultaneously available to a user. As an example, a qualified beverage pour may be a minimum size of beverage, such as medium. Alternatively, a qualified beverage pour may be a blended beverage that the user creates on the beverage dispenser app 112 or dispenser 102 directly via a user interface on the display 134, which may be a touchscreen display.

In determining whether a selected beverage qualifies as a qualified beverage pour, a notification (not shown) may be presented to a user of the beverage dispenser app 112. In determining the qualifications to satisfy a beverage selection to be a qualified beverage pour, an operator may set a daily, weekly, or monthly challenge, for example, and then the user knows what beverages are to be purchased to meet the qualification. The qualifications in one embodiment may be communicated to the mobile device 110 for display to the user. In an embodiment, the software 120 may be configured to create dynamic rules for the qualified beverage pour based on a variety of factors of the user, such as demographics, geographies, historical usage, health factors of the user (optionally entered in the beverage dispenser app 112), and so on. In being dynamic, the software 120 may be configured to maintain multiple qualified beverage pour criteria and apply a received beverage request after sensing that a beverage is completed. A third-party server 136 that is operated by a third-party to an operator of the dispenser server 118 or dispenser 102 may also provide for one or more qualification rules in order for a beverage pour to be considered a qualified beverage pour. The third-party may be an advertiser that wants to target market to users of the beverage dispenser app 112. As an example, the third-party may be an online store that distributes music so that the third-party may elect to offer a free music download in response to a user completing 10 qualified beverage pours.

In general, a food outlet at which the dispenser 102 is located may provide rewards (e.g., coupons) and/or promotions in response to the user reaching a certain number, for example, of qualified beverage pours. The food outlet offering rewards and/or promotions may drive additional customer traffic as a result of the rewards and/or promotions being offered by the food outlet. In an embodiment, a food outlet may target particular brands/categories of beverages based on marketing campaigns (e.g., local, regional, national) or based on local inventory (e.g., need to sell certain flavor of beverage). To promote the offering, users who typically consume a certain beverage may be identified and marketing notifications may be communicated to those users. Alternatively, users who have not purchased certain beverages in the past may be targeted as a special incentive to have the user try the beverage. Still yet, if a new beverage flavor is being released, then a special "new release" promotion may be distributed to one or more groups of users who may be more inclined to try new beverage flavors.

In other examples, a qualifying beverage pour may be determined based on a user, location (e.g., geographic, food outlet, etc.), volume dispensed (e.g., 20 fluid ounces), number of beverages purchased (e.g., 5 beverages), duration of time during which beverage(s) are dispensed (e.g., within certain hours, certain days, date/time period, etc.), type of beverage (e.g., particular brand(s), blends), ordering process (e.g., via a mobile device, at the food outlet), in combination with particular food orders, or any other combination. Based on rules applied to an individual user, the user may earn rewards and/or promotions as a result of the user satisfying specific qualifying beverage pour criteria. The specific beverage pour criteria may be displayed or otherwise communicated to the user via the dispenser 102, dispenser app 112 on his or her mobile device 110, via an electronic message (e.g., text message, email), or otherwise. The rules may be applied by the dispenser 102 or dispenser server 118.

As an example of a third-party operation, the third-party server 136 may be used to administer a campaign and process rewards. For example, a beverage supplier of ingredients that are dispensed by the dispenser 102 may apply rules against dispensing activities to track when a particular customer meets the rules of the campaign. An event notification may be captured and sent to the third-party server 136 by the dispenser server 118 in response to a beverage, including a qualifying beverage, is dispensed. The third-party (e.g., marketing agency) may be responsible for actually generating rules and loading the rules into a rules engine. Similarly, a third-party (e.g., tracking agency) may be responsive for tracking qualified pours over time to meet a threshold number of qualified pours for a reward. Alternatively, the dispenser server 118 may perform such tracking. In an embodiment, the third-party server 136 may be configured to handle processing and delivery of rewards to users in response to receiving an event notification that the user meets the threshold number of qualified pours. It should be understood that an independent rewards processor or a direct integration with a partner outlet rewards program (e.g., a movie theater's frequent user account of a user) may be established.

It should be understood that many different marketing and advertising scenarios may be provided for establishing qualified beverage pours. And, as previously indicated, the qualified beverage pours may be static or dynamic as a function of a variety of factors. In an embodiment, the qualifications may be varied in a linear or non-linear manner, such that different levels of qualification may be created. For example, a qualification for a free music download may start at 5 qualified beverage pours, a next free music download may increase to 10 qualified, and then a next free music download may increase to 15 qualified beverage pours. Alternatively, the number of qualified beverage pours may scale exponentially or use any other linear or non-linear mathematical function for qualified beverage pours. In some cases, the qualified beverage pours may be varied or become progressively more involved or complicated over time. For example, a first qualified beverage pour may be to simply use the beverage dispenser app 112 to cause the dispenser 102 to pour a beverage. A second qualified beverage pour may be to create a blended beverage that is dispensed by the beverage dispenser 102. A third qualified beverage pour may be to receive and select a shared blended beverage from a friend via the beverage dispenser app 112 that is dispensed by the dispenser 102. Other qualified beverage pour criteria may be set for users to meet, and the dispenser 102 and/or dispenser server 118 may validate the beverage pours to determine whether or not the set qualifications are met. In an embodiment, qualified beverage pours may be set for multiple people in a group to perform qualified beverage pours to encourage groups of people to utilize the beverage dispenser app 112 and dispenser 102. The group may use the same or different dispensers and be collectively tracked via the dispenser server 118.

The beverage dispenser app 112 may be configured to store and display rewards to the user. In an embodiment, the beverage dispenser app 112 may be configured to provide the user with a URL hyperlink to claim his or her reward. A push notification about achieving a reward or about a status of the user's progress in achieving the reward may also be available by the beverage dispenser app 112. In an embodiment, messaging from an entity offering a reward may be available. The messaging may be via SMS text messages, email, push notifications, or otherwise to notify the user of available rewards, current status towards achieving a reward, performing qualified beverage pours, and/or collecting on his or her reward. The rewards may be provided in the form of a machine readable code (e.g., barcode, QR code), voucher, gift certificate, encoded link to a URL that automatically enables a reward to be downloaded, unique identifier, or otherwise.

The qualifications may stay the same or be varied to help the user learn how to better use the beverage dispenser app 112, and may dynamically increase in difficulty as the user increases his or her skill level, which may or may not be displayed to the user via the beverage dispenser app 112. Still yet, the qualifications may vary to help the user learn about new ingredients (e.g., beverage brands). As an example, if a new beverage brand or flavor is added to the dispenser 102, then the operator of the dispenser server 118 may communicate a challenge or qualifier to the mobile electronic device 104 to alert the user of a current qualified beverage pour or set of qualified beverage pours. In an embodiment, a limited time qualification may be set (e.g., today only), and pushed to the mobile electronic device 110 for display on the app 112.

In response to the dispenser server 118 receiving the beverage request data 114, the software 122 (e.g., tracking logic) being executed by the processing unit 120 may receive the beverage order data and determine whether the selected beverage qualifies as a qualified beverage pour. In an embodiment, qualified beverage pour settings (not shown) may be communicated from the dispenser server 118 or otherwise provided to the dispenser 102 to enable the dispenser 102 to determine when the dispenser 102 dispenses a beverage that qualifies as a qualified beverage pour. In response to determining that a beverage that is dispensed qualifies as a qualified beverage pour, then the dispenser may communicate a message 138 to the dispenser server 118 to update a record of the user that is tracking qualified beverage pours. The message 138 may include a user ID and indicator of the qualified beverage pour so that a data record of the user may be updated. Other information may be communicated to the dispenser server 118, including beverage code to indicate the specific beverage that was poured.

In an alternative embodiment, rather than the dispenser determining whether a dispensed beverage qualifies as a qualified beverage pour, the message 138 including the beverage code along with a user ID may be communicated to the dispenser server 118, and the dispenser server 118 may determine whether a dispensed beverage qualifies as a qualified beverage pour. In either case, the dispenser server 118 may communicate a reward notification 140 to the mobile electronic device 110 so that the beverage dispenser app 112 may enable the user to determine or confirm that the dispensed beverage qualified as a qualified beverage. It should be understood that another server, such as a customer server, other than the dispenser server 118 may be utilized to process dispenser pours by (i) processing dispenser beverage requests, (ii) determining whether the dispenser pours are qualified, manage qualified beverage pours for users, and (iii) communicating messaging to users of the beverage dispenser app to indicate notifications of rewards or other compensation earned by the user by using the beverage dispenser app 112. If a customer server is used, the customer app may be configured to handle customer communications via a mobile app or other application, thereby reducing the burden from the dispenser server 118. In addition, irrespective of which server manages the qualified beverage pour process, data records of each of the users may manage qualified pours for each of the users, including storing rewards for qualified pours, enabling third parties to access the data records to verify rewards for each of the users, and so forth.

In one embodiment, the dispenser 102 may be configured to be autonomous with respect to the dispenser server 118. In particular, a set of qualified beverage pours may be communicated to the dispenser 102 from the dispenser server 118, which enables the dispenser 102 to operate independent of the dispenser server 118. The dispenser 102 may communicate locally with the mobile electronic device 110 (or any other electronic device), thereby being able to operate irrespective of a communications channel via the network 116 being operational. The tracking logic being executed by the processing unit 104 may handle the processing and rewarding with the beverage dispenser app 112, and store operational data (e.g., user ID, qualified beverage dispenses, rewards, and so forth) in the local database 106. The information collected by the dispenser 102 may thereafter be communicated to the dispenser server 118 to update the data repository 130.

As shown, the mobile electronic device 110 may perform a handshake communication directly with the dispenser 102 via a communications path 142, and the beverage request data 114 may be communicated to the dispenser 102 for dispensing thereby. The mobile electronic device 110 may communicate with the dispenser 102 directly or indirectly via the dispenser server 118. In response, a qualified reward message (not shown) may be communicated hack to the mobile electronic device 110 from the dispenser 102 in response to the tracking logic being executed by the processing unit 104 verifying that the dispensed beverage is a qualified beverage pour. Alternatively, the dispenser 102 may communicate the beverage request data 114 along with dispensed beverage information or confirmation of a qualified beverage pour, and the dispenser server 118 may communicate a reward message, which may include an update if the user has not qualified for a reward.

Figure 1B:
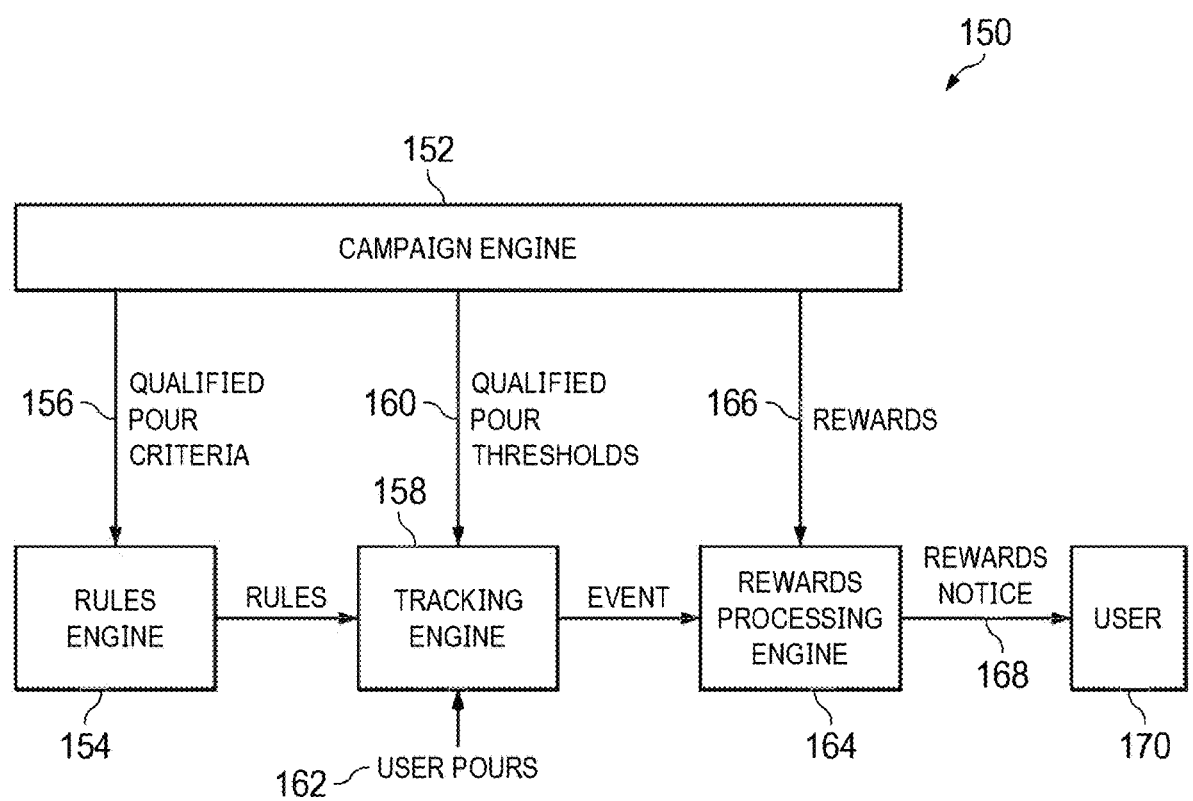
FIG. 1B is a block diagram of an illustrative server-side architecture for supporting a campaign that uses tracking of users functionality via a beverage dispenser.

With regard to FIG. 1B, a block diagram of an illustrative server-side architecture 150 for supporting a campaign that uses tracking of users functionality via the beverage dispenser is shown. The server-side architecture 150 may be included within software 122 being executed by of FIG. 1A or located and executed by a separate server in communication with the dispenser server 118. In an embodiment, the dispenser server 118 may at least in part operate as a tracking server. It an alternative embodiment, a tracking server with which the dispenser server 118 is in communication may be configured with the server-side architecture 150. The architecture 150 may be software executed by a server or other computing system and/or hardware.

A campaign engine 152 may be configured to enable a dispenser operator (e.g., food outlet), dispenser producer, third-party marketer, or otherwise create a campaign to drive users of beverage dispensers to use or increase usage of the beverage dispensers. The campaign engine 152 may also enable a marketer to establish qualified pour criteria and thresholds for qualified pours. Moreover, the campaign engine 152 may allow for a marketer set rewards for identified users who achieve pour thresholds.

A rules engine 154 may be configured to establish criteria for what qualifies as a qualified pour (e.g., beverage dispense 12 ounces or more), what qualifies for achieving a reward (e.g., 5 beverage dispenses within 5 weeks), limitations for beverage pours (e.g., 1 per day), and so on. The rules engine 154 may further establish location (e.g., food outlet, geographic, etc.) as a rule that may be used in determining qualified pour. Moreover, the rules engine 154 may establish participation time limits (e.g., 1 qualifying pour per visit, 1 qualifying pour per hour, etc.), maximum number of pours per time period (e.g., day or week) as a rule. Other rules, such as team members or friends who participate in conjunction with a user to receive additional rewards, for use in determining qualifying pours may be used, as well.

In an embodiment, qualified pour criteria 156 may be established by a campaign sponsor, such as a food outlet. The qualified pour criteria 156 may utilize a number of parameters as part of rules 157, where the parameters may include dispenser identification information (e.g., dispenser ID, dispenser location, outlet location, outlet ID, etc.) along with composition data record of a dispense. The rules engine 154 may enable an operator to preset general criteria or be configured to dynamically adjust for individual users based on historical usage (e.g., low levels of pours for low usage users, increasingly higher levels of pours for engaged users, high levels of pours for high usage users). The rules engine 154 may provide for different food outlets to set the same or different criteria for individual users. In an embodiment, the rules engine 154 may support competition between food outlets by allowing each to food outlet to set dynamic pricing models in local regions.

As an example, a sponsor of a campaign may want to drive customer traffic to specified locations. For example, a 5-for-5 ($5 coupon for a food outlet in return for pouring 5 qualifying beverages at that food outlet) campaign that is national for an outlet (e.g., qualified beverages poured from beverage dispensers at all restaurants of a particular brand), regional for a food outlet (e.g., just for a restaurant brand in a particular region specified by the campaign); local (e.g., a franchisee wants to run a local campaign in a set of food outlets that a franchisee owns); individual (e.g., a particular dispenser). Campaigns that span across multiple outlets may also be run (e.g., one qualified pour from each of 5 different food outlets qualifies for a reward) to drive traffic to outlets that have adopted a beverage dispenser.

A tracking engine 158 may be configured to receive and track individually identifiable beverage dispenses from one or more dispensers. In an embodiment, the campaign engine 152 may be configured to communicate qualified pour thresholds 160 to the tracking engine 158 that may use the thresholds 160 to determine whether users pour beverages that satisfy campaigns. If a user does not pour a beverage that satisfies a pour threshold, then the tracking engine 158 may store the fact that the user poured a beverage, but that the beverage failed to satisfy the qualifications (and include specific beverage, amount poured, and timestamp for verification purposes). If the user does pour a beverage that satisfies a pour threshold, the tracking engine 158 may store information about the pour along with crediting the user with the qualified pour. The tracking engine 158 may be configured to receive communications with user pours 162 from dispensers (or other electronic systems) from one or more food outlets that operate dispensers that are capable of supporting functionality for promoting beverage dispenses. In particular, the individually identifiable beverage dispenses may be associated with a user by identifying a user ID, mobile ID, or any other information that identifies a user who engages with one or more dispenser to obtain rewards and/or promotions for dispensing beverages, as further described herein. The dispenses may, of course, include actual dispensed beverage information, including beverage type, amount poured, timestamp, and so on. The tracking engine 158 may further be configured to store received information in a data repository on a server, such as the data repository 130 on dispenser server 118.

A profile records engine (not shown) may be integrated or separate from the tracking engine 158, and be configured to manage individual records for users who are identified for qualified beverage pours. The profile records engine may be configured to manage a database inclusive of information, such as user name, user age (specific or range), user birthday, user nickname, user address(es) (electronic and/or physical), that tracks user usage of dispensers and rewards and/or promotions achieved by performing qualifying pours, as described herein, user level, user games played, user selected options (e.g., notifications allowed), and/or any other information.

A rewards processing engine 164 may be configured to manage processing rewards of campaigns for users of beverage dispensers who satisfy qualified pour thresholds. In an embodiment, the rewards processing engine 164 may be engaged by the tracking engine 158 in response to the tracking engine 158 receiving an event (e.g., notice of a qualified beverage pour of an identified user). The engine 164 may be configured to received rewards 166 that may be issued to a user for satisfying the qualified pour thresholds 160. The rewards 166 may be specific to particular food outlets, for example, to particular users, particular type of user, and so on. In response to receiving an event of an identified user 170, the engine 164 may access a data repository so as to determine whether the user 170 has satisfied a reward criteria. In response to determining that the user 170 has satisfied a reward criteria, a rewards notice 168 inclusive of a reward (along with updating the data repository with the reward) may be communicated to the user (i.e., via a mobile device or other electronic device). Alternatively, the engine 164 may communicate a rewards notice 168 that indicates that the user has not yet achieved a reward, but provide status of the user's efforts, as further described herein.

Figure 2A:
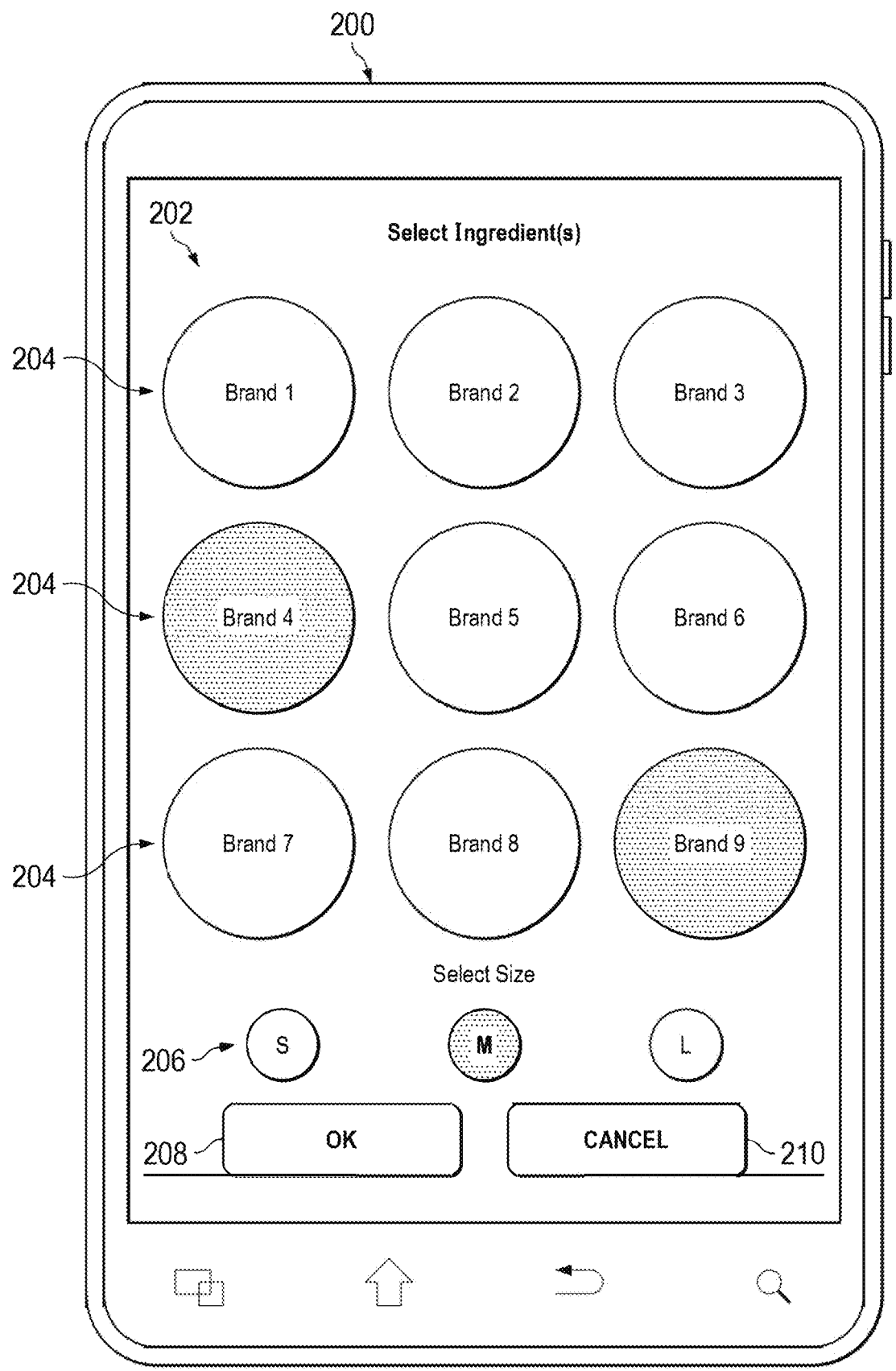
FIG. 2A is an illustration of an illustrative mobile electronic device shown to be displaying a user interface that enables a user to select one or more beverage ingredients (e.g., beverage brands or types) for inclusion in a dispensed beverage.

With regard to FIG. 2A, an illustration of an illustrative mobile electronic device 200 is shown to be displaying a user interface 202 that enables a user to select one or more beverage ingredients, in this case Brand 1-Brand 9, for inclusion in a dispensed beverage. User interface 202 may include a listing of multiple brands within selectable elements 204 that enables the user to select one or more ingredients to be included in or blended to create a beverage. If the user selects multiple ingredients, such as "Brand 4" an "Brand 9," then those ingredients may be combined or blended into a dispensed beverage by a dispenser. In addition, the user interface 202 may enable the user to select a beverage size using selectable elements 206, shown here as beverage sizes small "S," medium "M," or large "L" beverage sizes. A mobile app that, when executed by a processing unit of the mobile electronic device 200a, may be used to display the user interface 202, so as to receive user selections of the ingredients (e.g., "Brand 4" and "Brand 9") and selected beverage size (e.g., "medium M" beverage size). If the user is satisfied with his or her selections of beverage ingredients and size, the user may select an "OK" soft-button 208, and if the user decides not to proceed, the user may select a "cancel" soft-button 210. It should be understood that the same or similar user interface features may be executed on a dispenser or other electronic device.

Figure 2B:
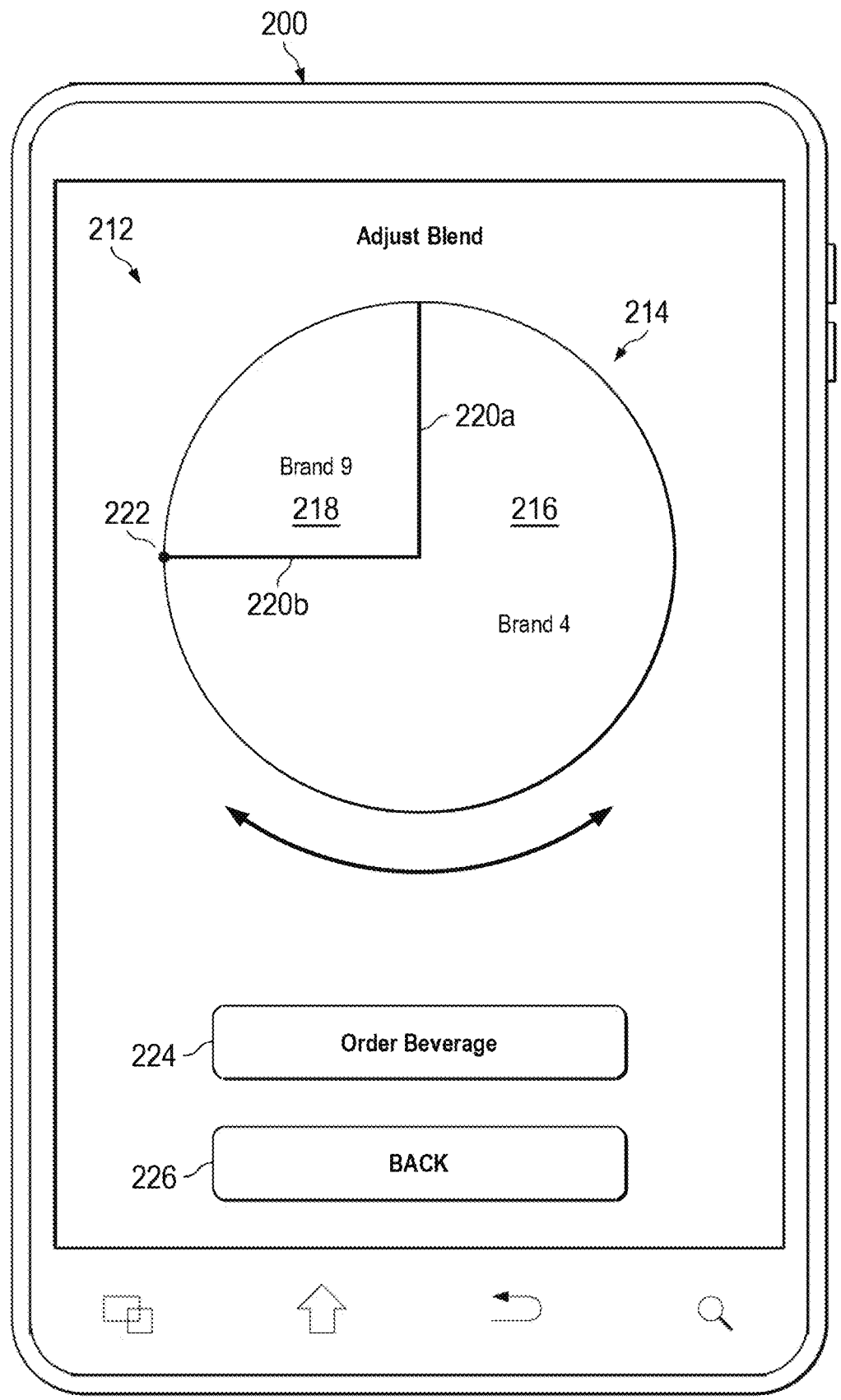
FIG. 2B is an illustration of an illustrative mobile electronic device shown to include a user interface that enables a user to select a blend of ingredients selected from user interface of FIG. 2A.

With regard to FIG. 2B, an illustration of an illustrative mobile electronic device 200 is shown to include a user interface 212 that enables a user to select a blend of ingredients selected from user interface 202 of FIG. 2A. The user interface 202 includes a graphical user display element 214, in this case a pie chart, that includes two ingredients (e.g., "Brand 4" and "Brand 9") that were selected from user interface 202 of FIG. 2A displayed thereon. The graphical user display element 214 may include two regions 216 and 218 defined by divider lines 220a and 220b. The ingredients may be displayed in respective regions 216 and 218. A graphical user element 222, in this case a circle at the end of line 220b, may enable the user to rotate the line around the pie chart to define relative percentages of the two ingredients to be blended into a beverage. Alternative graphical user elements for representing and adjusting blend percentages for two or more ingredients may be utilized. As shown, the beverage is set to be blended with "Brand 4" 75% and "Brand 9" to be 25%. If the user is satisfied with his or her beverage blend, the user may select an "Order Beverage" soft-button 224. Alternatively, the user may select a "Back" soft-button 226 to go back to user interface 202.

Figure 2C:
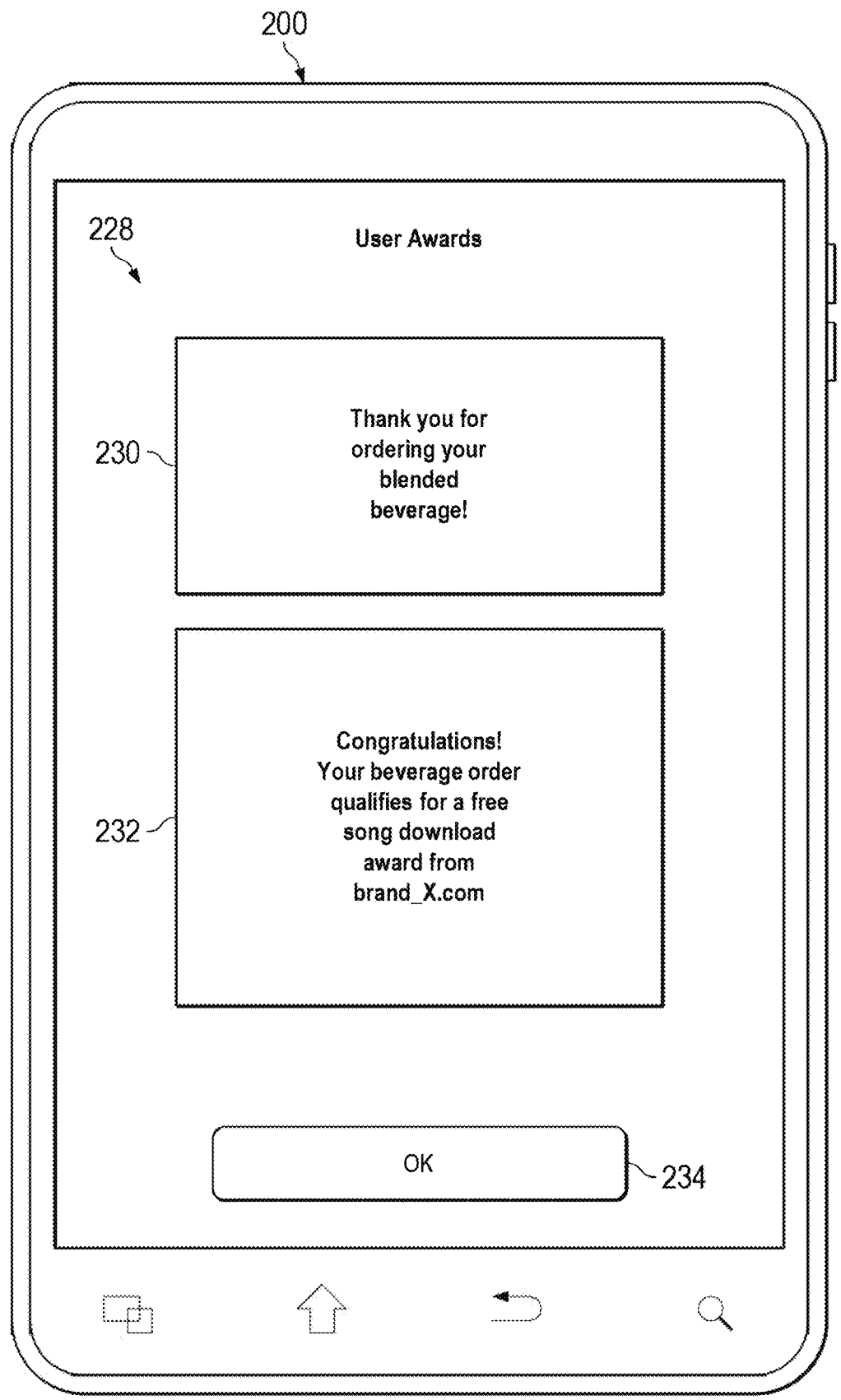
FIG. 2C is an illustration of the mobile electronic device shown to be displaying user interface to present messages to the user in response to the user ordering and dispensing a beverage, and the beverage determined to be a qualified beverage pour.

With regard to FIG. 2C, an illustration of the mobile electronic device 200 is shown to be displaying user interface 228 to present messages 230 and 232 to the user in response to the user ordering and dispensing a beverage, and the beverage determined to be a qualified beverage pour. As shown, message 230 may be a message that indicates that the user ordered a blended beverage, and message 232 may indicate that the ordered beverage was a qualified beverage pour along with a sponsor, in the this case brand_X.com, promoting a reward, in this case a free song download. If the beverage pour were determined not to be a qualified pour, then the message 232 may indicate that the beverage pour did not qualify. The user may select an "OK" soft-button 234 after reading the messages 230 and 232. In addition, the message 232 may show how many more qualified beverage pours are needed for the reward, for example.

Figure 3A:
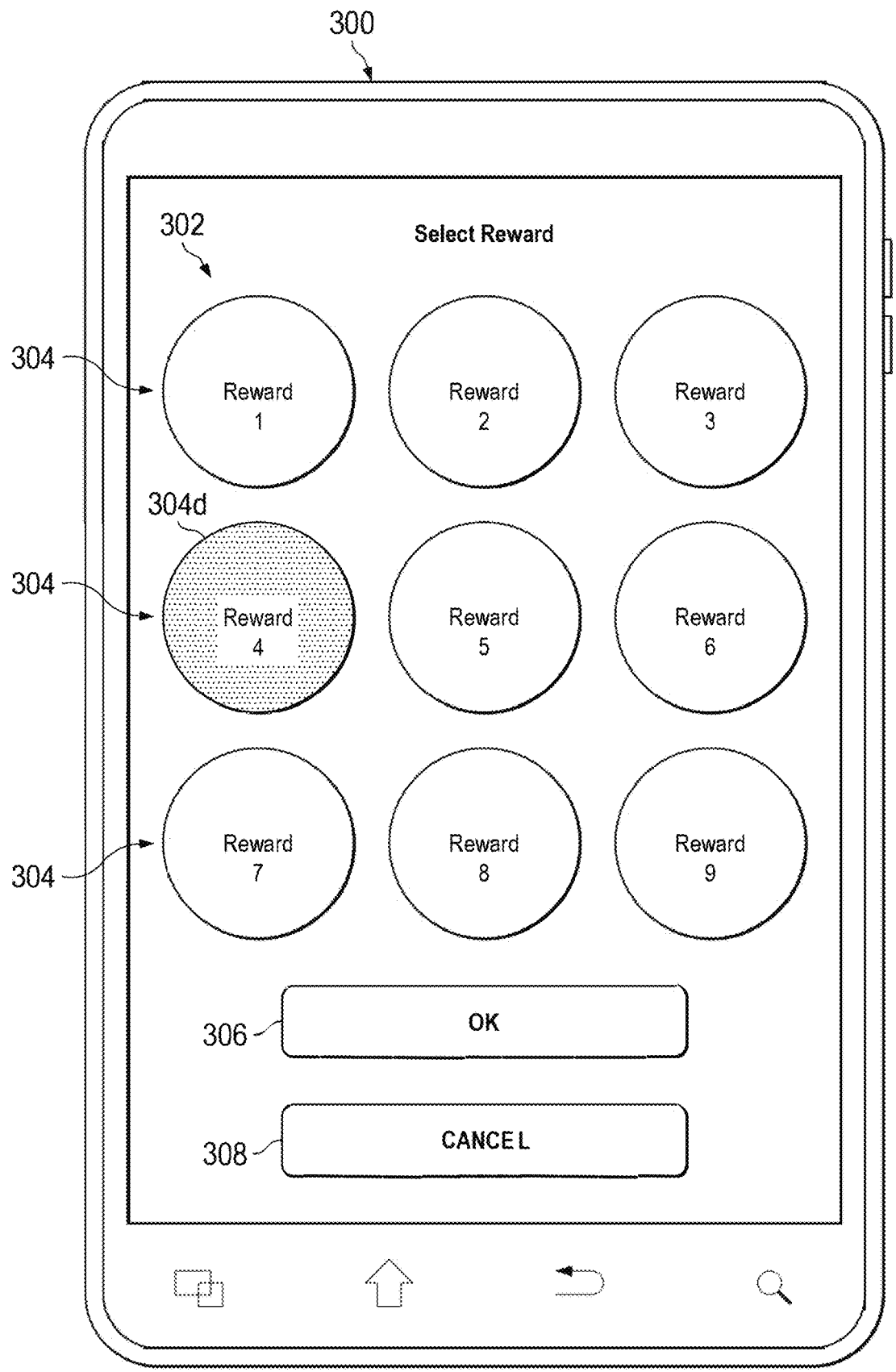
FIG. 3A is an illustration of an illustrative mobile electronic device shown to be displaying a user interface on which selectable rewards are displayed.

With regard to FIG. 3A, an illustration of an illustrative mobile electronic device 300 is shown to be displaying a user interface 302 on which selectable rewards 304. The selectable rewards may be offered by (i) a food outlet in which a dispenser is located, (ii) operator of the beverage dispenser, (iii) producer of ingredients being dispensed by the dispenser, or (iv) third-party marketers who want to market to users of the beverage dispenser. As shown, the user has selected "Reward 4" soft-button 304d. If the user is finished, the user may select an "OK" soft-button 306. Otherwise, the user may select a "Cancel" soft-button 308. The user may return to the user interface 302 to change his or her reward selection. Although the rewards are shown to be selectable, in an alternative embodiment, the app may offer a non-selectable reward to the user.

Figure 3B:
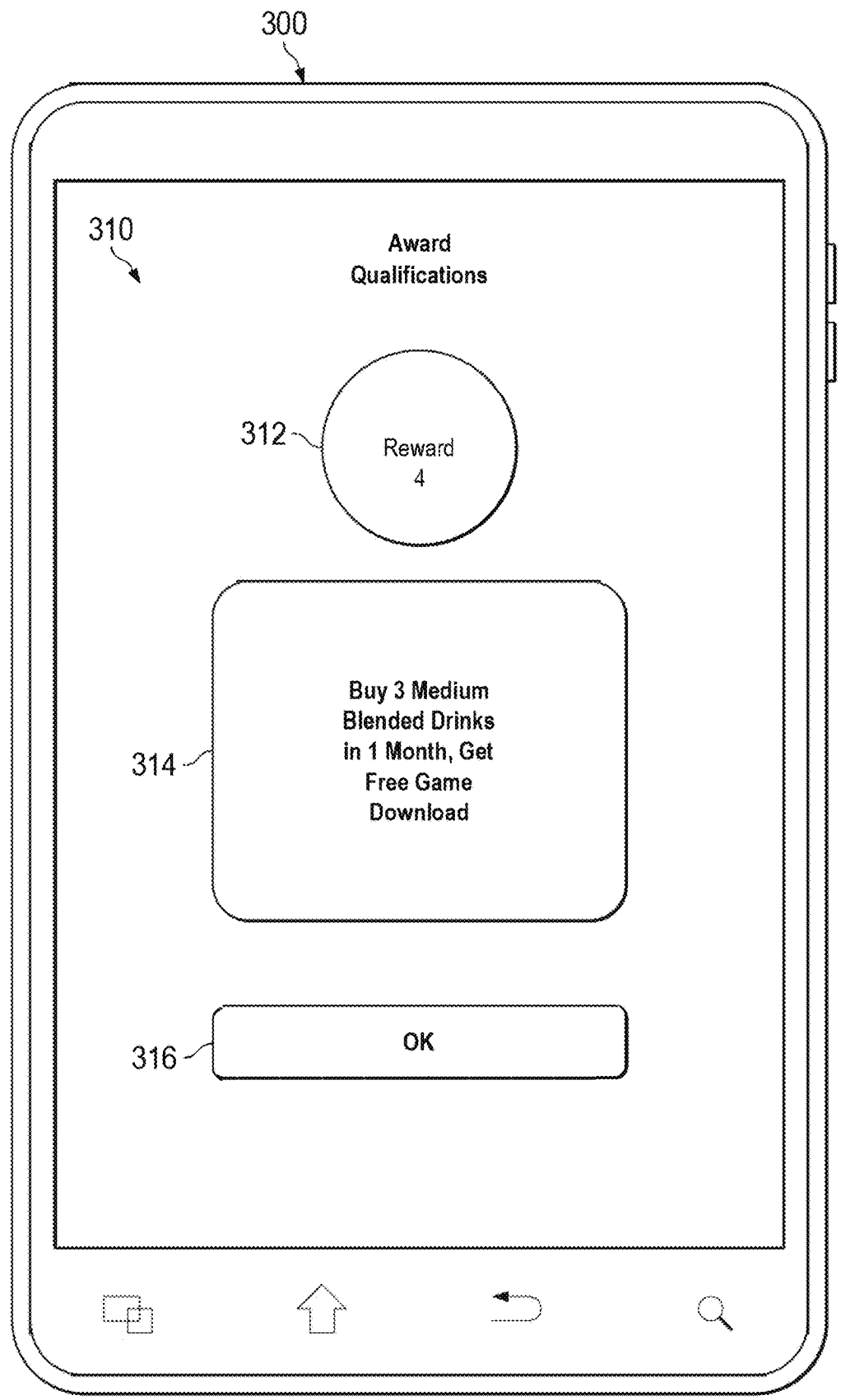
FIG. 3B is an illustration of an illustrative mobile electronic device shown to be displaying another user interface on which qualifications to achieve a selected reward from FIG. 3A may be presented.

In response to the user selecting selectable soft-button 304d, a user interface 310 shown in FIG. 3B may be displayed. The user interface 310 may display an indication 312 of the reward that was selected and a reward offer message 314 that notifies the user of the qualifications for achieving a selected reward, in this case "Reward 4," from FIG. 3A The user may select an "OK" soft-button 316 to finish viewing the reward offer message 314, and return back to the user interface 302 of FIG. 3A.

Figure 4A:
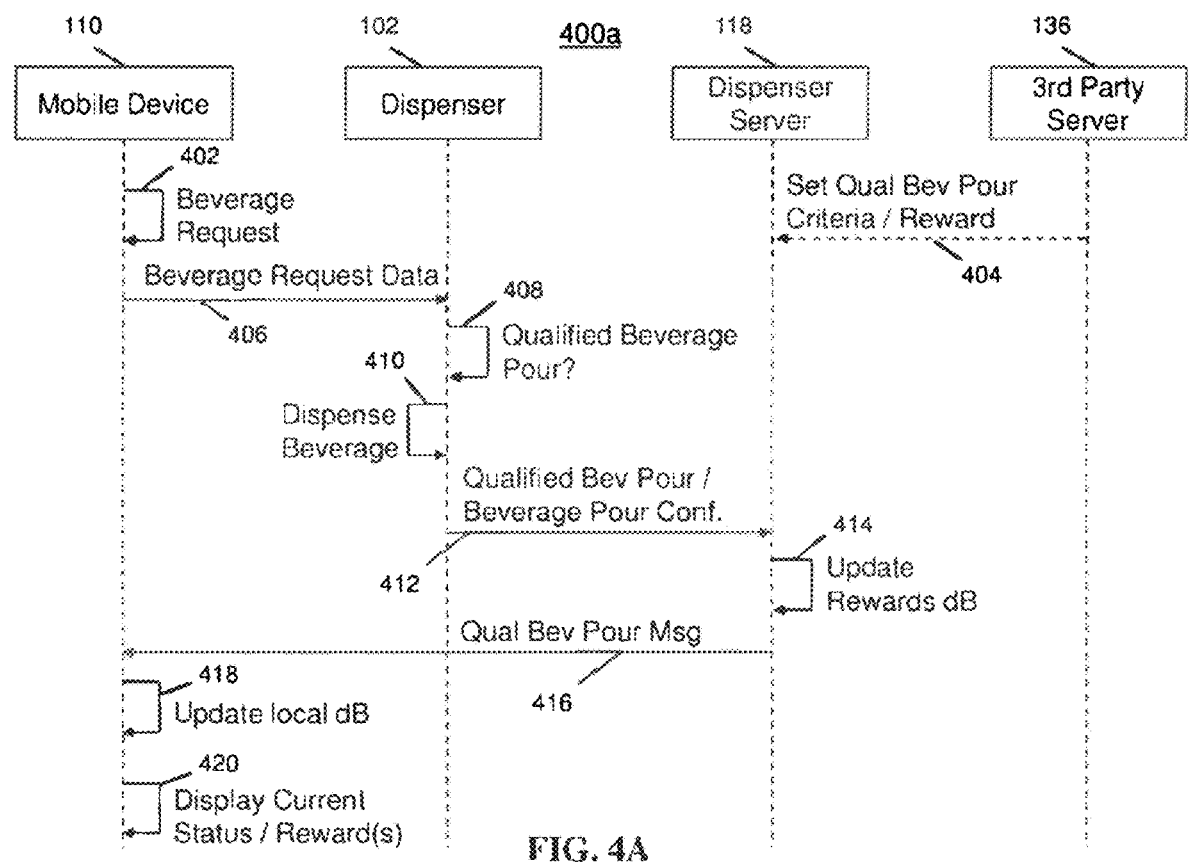
FIG. 4A is an interactive diagram that shows communications between electronic devices used for supporting a system for tracking qualified dispensed beverages at participating customer locations.

With regard to FIG. 4A, an interactive diagram 400a that shows communications between electronic devices used for supporting a system for tracking qualified dispensed beverages at participating customer locations is shown. The electronic devices are those shown in FIG. 1A including mobile device 110, dispenser 102, dispenser server 118, and third-party server 136.

At step 402, a beverage request from the mobile device 110 may be received from a user. The beverage request 402 may be made using a mobile app that enables the user to select and optionally create blended beverages for dispensing by the dispenser 102. At step 404, a third-party using the third-party server 136 may set a qualified beverage pour criteria and reward for a user who meets the qualifications of the qualified beverage pour criteria. It should be understood that the third-party server 136 may alternatively be any other communications device, such as a desktop computer, laptop computer mobile device, and so forth. Alternatively, the third-party may instruct the operator of the dispenser, and the operator may set the qualified beverage pour criteria. The qualified beverage pour criteria may include one or more qualified beverages to be poured by a user in order to be counted in an effort by the user to receive the reward. The reward may include any physical or virtual item of commercial value, including downloadable content, gift card, Emoji, sweepstakes entry, or any other reward. The step 404 is shown to be a dashed line, as a reward may alternatively be set by an operator of the dispenser 102 or food outlet (e.g., restaurant) that may have the dispenser 102 available for use by the user of the mobile device 110. In response to receiving the criteria and reward, the dispenser server 118 may set the criteria to be used for later processing by the server 118 and/or communicate the criteria to the dispenser 102 for use in processing thereby.

The beverage request at step 402 may be made by the user to select a beverage with a single ingredient or beverage with multiple ingredients, such as a custom created beverage by the user, as described with regard to FIG. 1A and FIGS. 2A-2B. At step 406, beverage request data may be communicated to the dispenser 102 if the mobile device 110 has a direct communication link with the dispenser 102. At step 408, a determination may be made by the dispenser 102 whether a qualified beverage pour has been requested. The determination may be made after the beverage requested has been poured. At step 410, the requested beverage may be dispensed by the dispenser 102. At step 412, a communication from the dispenser 102 to be dispenser server 118 may be made with the qualified beverage pour and beverage pour confirmation. That is, if the beverage pour was determined to be qualified, a notification that the qualified beverage pour was made may be sent to the dispenser server 118, or if the beverage pour was determined not to be qualified, a notification that a non-qualified beverage pour was made may be sent to the dispenser server 118. The communication may include a user ID to associate the transaction with the user.

At step 414, the dispenser server 118 may update a rewards database. The rewards database may be a user tracking database for those users using the mobile app that enables the user to request beverages from the dispenser. If a user tracking database exists, the rewards database may simply be a rewards field associated with other data records of the user. At step 416, a qualified beverage pour message may be sent from the dispenser server 118 to the mobile device 110, where the message may include that the beverage pour was qualified or unqualified.

At step 418, a local database may be updated, where the local database may simply be information stored in a memory on the mobile device 110. The local database may include one or more rewards fields depending on how many rewards are being offered to the user (e.g., multiple advertisers with different criteria, different food outlets, etc.). At step 420, the mobile device 110 may display current status and rewards in response to the qualified beverage pour message from step 416. In an embodiment, if the user has earned a reward, then the reward may be displayed. Alternatively, if the user has achieved another qualified beverage pour, then a counter may be updated and presented to the user (e.g., "Your beverage was qualified beverage pour 4-of-5. One more qualified beverage pour needed to earn your reward!"). Multiple counters may be utilized for each respective user if multiple rewards are being offered.

Upon any of the counters reaching a threshold value, a determination may be made that the user has achieved a respective reward, update a database associated with the user of the achieved reward, and communicate a message of the user's achieved reward. If the reward is not yet achieved, an update message indicative of the status of the respective counter may be sent to the user (e.g., electronic device of the user, such as a mobile app operating on a user's mobile device). In an embodiment, different values may be established for different qualified beverage pours. In such a configuration, incrementing a counter may include incrementing a counter by more than a signal value (e.g., counter=counter+3). A counter is understood to be a conventional numerical counter or may include a collection or set of other non-numerical items (e.g., bottles), thereby the counter may be other than a per se counter as understood in the field of computer science. As an example, the counter may operate in a gaming setting, such that a player's piece may move from a starting line to a finish line (e.g., football goal line), where the counter may be considered to cross a threshold value upon the player's piece crossing the finish line.

Figure 4B:
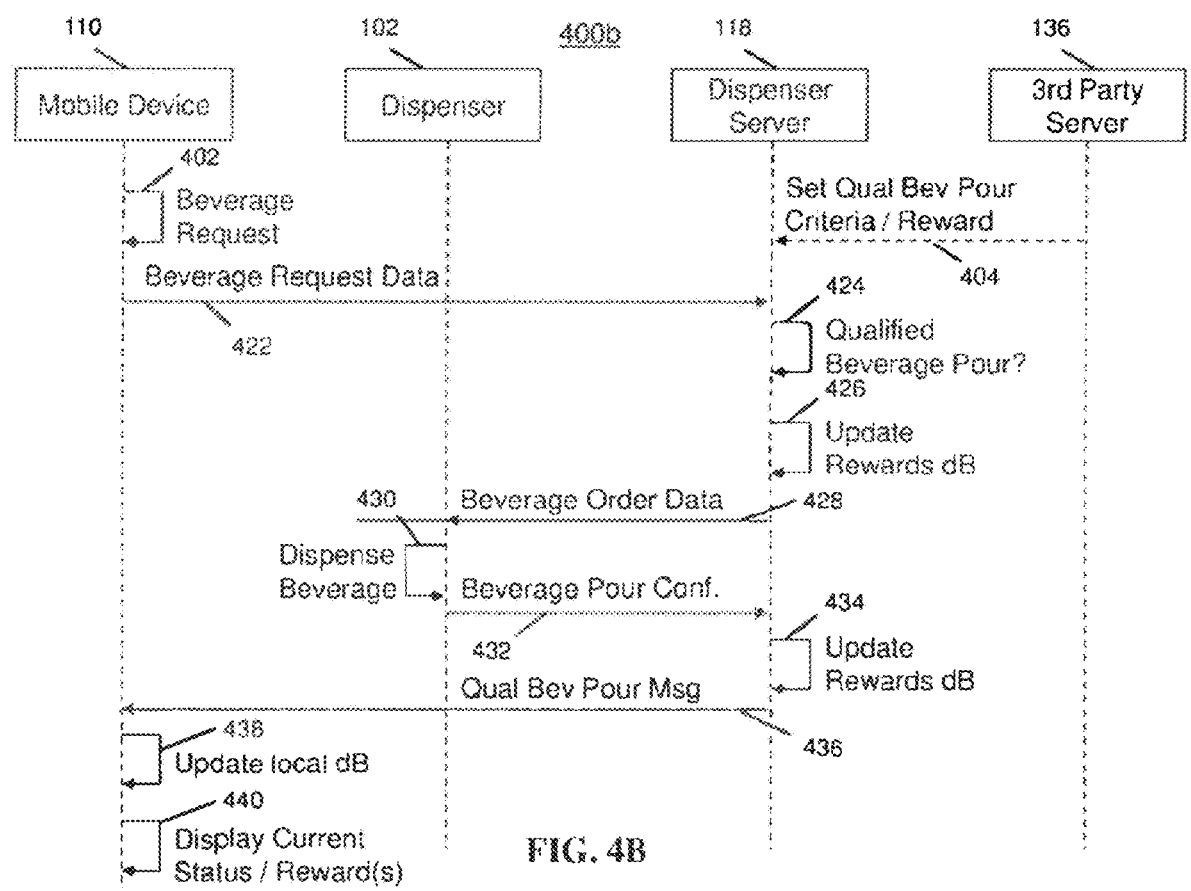
FIG. 4B is an interactive diagram that is an alternative embodiment of FIG. 4A for communications to support a system for tracking qualified dispensed beverages at participating customer locations.

With regard to FIG. 4B, an interactive diagram 400b that is an alternative embodiment of FIG. 4A for communications to support a system for tracking qualified dispensed beverages at participating customer locations is shown. The electronic devices are those shown in FIG. 1A including mobile device 110, dispenser 102, dispenser server 118, and third-party server 136.

At step 402, a beverage request from the mobile device 110 may be received from a user. The beverage request 402 may be made using a mobile app that enables the user to select and optionally create blended beverages for dispensing by the dispenser 102. At step 404, a third-party using the third-party server 136 may set a qualified beverage pour criteria and reward for a user who meets the qualifications of the qualified beverage pour criteria. It should be understood that the third-party server 136 may alternatively be any other communications device, such as a desktop computer, laptop computer mobile device, and so forth. The qualified beverage pour criteria may include one or more qualified beverages to be poured by a user in order to be counted in an effort by the user to receive the reward. The reward may include any physical or virtual item of commercial value, including downloadable content, gift card, Emoji, sweepstakes entry, or any other reward. As with the process 400a of FIG. 4A, the step 404 is shown to be a dashed line, as a reward may alternatively be set by an operator of the dispenser 102 or food outlet (e.g., restaurant) that may have the dispenser 102 available for use by the user of the mobile device 110.

The beverage request 402 may be made by the user to select a beverage with a single ingredient or beverage with multiple ingredients, such as a custom created beverage by the user, as described with regard to FIG. 1A and FIGS. 2A-2B. At step 422, beverage request data may be communicated to the dispenser server 118. The beverage request data may include beverage composition data that describes composition (e.g., brand and/or ingredients) of a requested beverage. To establish the communications link with the server, the user may image or scan a machine-readable code at the dispenser 102, and the mobile app (or browser-based app) may cause the mobile device 110 to establish a communication with the dispenser server 118. At step 424, a determination may be made by the dispenser server 118 whether a qualified beverage pour has been requested. If so, then the rewards database or other database that maintains user rewards for qualified pours may be updated at step 426. As previously described, a qualified pour may include comparing beverage request data with qualified beverage pour criteria established by a third-party marketer, operator of the dispenser, food outlet, or otherwise.

At step 428, beverage order data may be communicated from the dispenser server 118 to the dispenser 102. The beverage order data may include a beverage code that was generated by the mobile device 110 or dispenser server 118 that is representative of beverage ingredient(s) and percentages thereof in the case of a blended ingredient beverage to be included in a blended beverage. At step 430, the requested beverage may be dispensed by the dispenser 102 in response to an instruction that is communicated to the beverage dispenser or generated by the dispenser in response to an operator selecting to dispenser the selected beverage via a user interface, for example. A beverage pour confirmation may be communicated from the dispenser 102 to the dispenser server 118 at step 432. The beverage pour confirmation may be used to confirm that the beverage poured was a qualified beverage pour. If the beverage pour was determined to be qualified by the dispenser 102, a notification that the qualified beverage pour was made may be sent to the dispenser server 118, otherwise, if the beverage pour was determined by the dispenser 102 not to be qualified, a notification that a non-qualified beverage pour was made may be sent to the dispenser server 118. Alternatively, information, such as a beverage code, that describes the ingredient(s) and size of the beverage that was actually poured may be communicated to the dispenser server 118 from the dispenser 102 for the dispenser server 118 to determine whether the poured beverage corresponds to the beverage order described in the beverage order data 428 that qualified or did not qualify as a qualified beverage pour. A user ID may be communicated at step 432, as well, to enable the dispenser server 118 to associate the qualified or unqualified beverage pour with the user.

At step 434, the dispenser server 118 may update the rewards database, as previously described. At step 436, a qualified beverage pour message may be sent from the dispenser server 118 to the mobile device 110, where the message may include that the beverage pour was qualified or unqualified. At step 438, a local database at the mobile device 110 may be updated, where the local database may simply be information stored in a memory on the mobile device 110. If the status of the qualified beverage pours is located on the "cloud," a database on the "cloud" may alternatively be updated. If the "cloud" database is at the dispenser server, then the mobile device 110 may utilize the already updated database of the dispenser server 118. In an embodiment, a reward ID may be communicated to the mobile device 110 if the user is being offered more than one reward.

At step 440, the mobile device 110 may display current status and rewards in response to the qualified beverage pour message from step 436. In an embodiment, if the user has earned a reward, then the reward may be displayed. Alternatively, if the user has achieved another qualified beverage pour, then a counter may be updated and presented to the user (e.g., "Your beverage was qualified beverage pour 4-of-5. One more qualified beverage pour needed to earn your reward!"). If multiple rewards are being offered and qualified pours collected, then multiple messages (words and/or icons) may be presented.

Figure 5A:
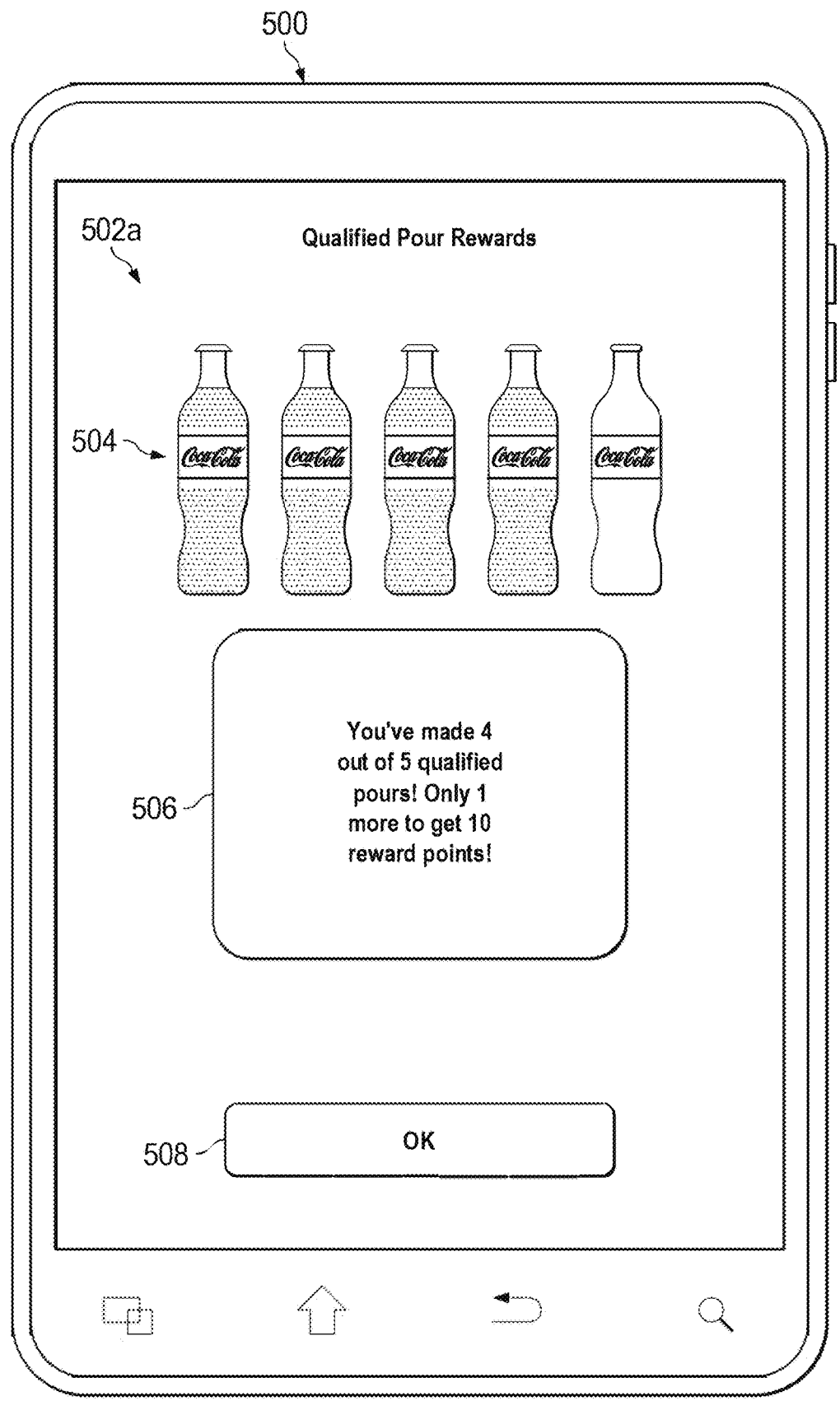
FIGS. 5A and 5B are illustrations of a mobile electronic device that is executing a mobile app that presents respective user interfaces to notify the user of current status of achieving a reward.
Figure 5B:
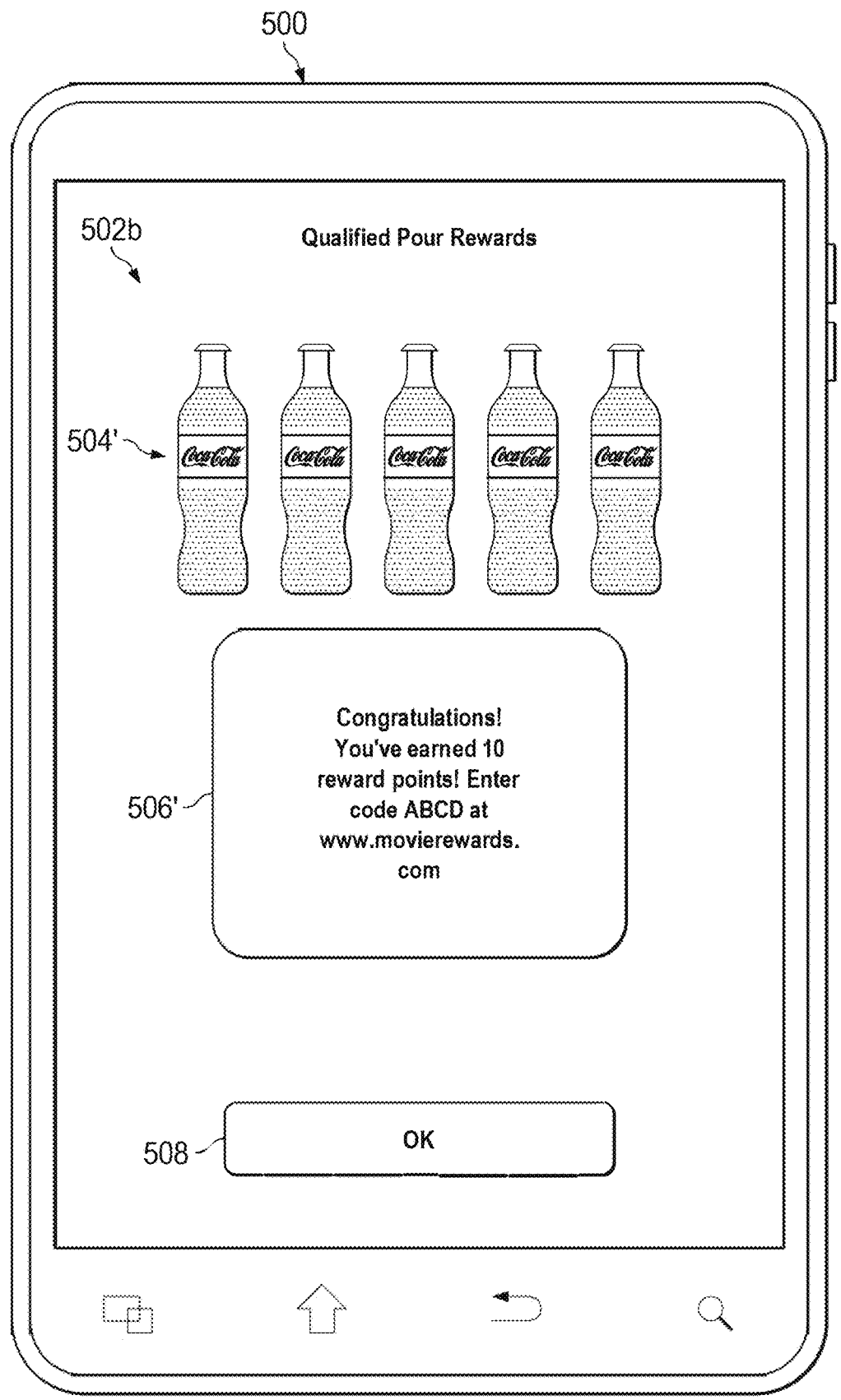

With regard to FIGS. 5A and 5B, illustrations of a mobile electronic device 500 that is executing a mobile app that presents respective user interfaces 502a and 502b to notify the user of current status of achieving a reward. The user interface 502a is shown to include a set of icons 504, in this case a set of Coca-Cola® bottle icons that include four full bottles and one empty bottle, which is indicative that the user has had four qualified pours out of a required five qualified beverage pours. A message 506 may state the current status of the number of qualified pours that the user has achieved and how many more are needed to earn a reward, such as a certain number of reward points (e.g., 10 reward points) that may be used to redeem rewards, for example. It should be understood that the user interface 502*a* is illustrative and that a wide variety of status update messaging may be provided to the user about requesting and dispensing qualified pours. If multiple rewards are being offered to the user, then multiple messages (e.g., rows of icons) may be displayed. And, if a pour qualifies for more than one reward, then the pour may be applied to each or the user may be requested to previously or dynamically select a reward to which the qualified reward is to be applied. For example, "You've made a qualified beverage pour! Please select from the below list of rewards to apply your qualified pour." The user may select an "OK" soft-button 508 after reviewing the user interface 502*a*.

In response to the user completing a required number of qualified pours, which may range from 1 to any number established by a marketer, then the set of icons 506 may change to a set of icons 504', where all of the images of the bottles are full so as to be indicative that the user has completed a challenge to have five qualified beverage pours. It should be understood that a wide variety of challenges, including time-based challenged (e.g., 5 qualified pours in 5 days), may be utilized and represented and/or otherwise presented to users of the mobile app (e.g., icons and countdown timer). As shown in FIG. 5B, the user is notified in message 506' about earning a certain number of points (e.g., 10 reward points) along with a code (e.g., "ABCD") that may be entered into a website. In an alternative embodiment, a machine readable indicia that may be scanned at a food dispenser (e.g., movie theater). Once completed, the user may select an "OK" soft-button 508 to return the user to the mobile app.

BINGO Promotional Game

Figure 6A:
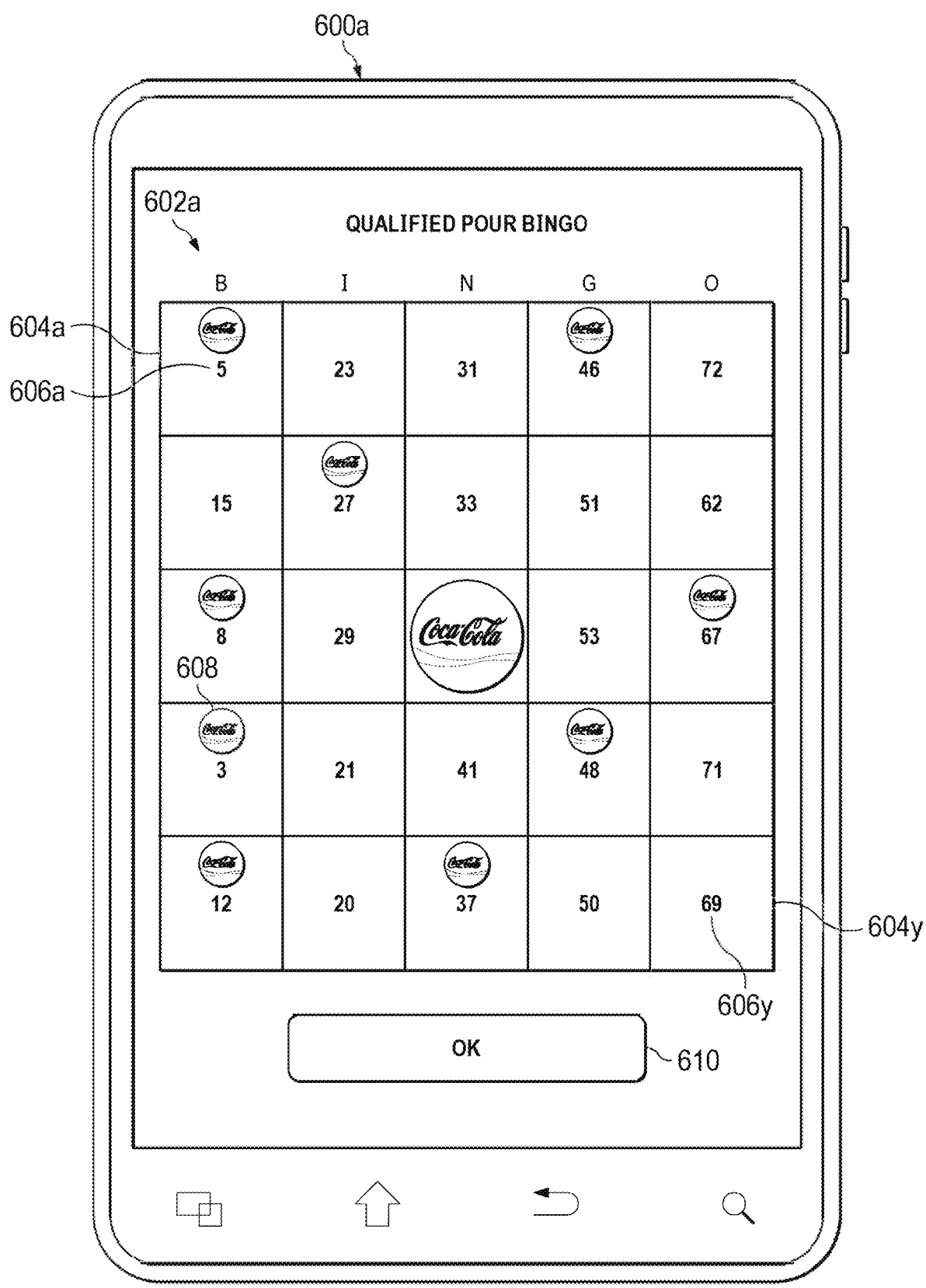
FIGS. 6A and 6B are screenshots of optional user interfaces of an illustrative game, in this case a bingo game.

With regard to FIG. 6, a screenshot of a mobile electronic 600 on which an illustrative promotional game that provides a digital game card 602*a*, in this case a qualified pour bingo game card, that a user may play when using dispensers is shown. The game card 602*a* is shown to include multiple spaces 604*a*-604*n* (collectively 604) in which numbers 606*a*-606*n* (collectively 606) may be displayed. In an embodiment, a legend (see below) may indicate to a user which types of beverages include numbers for each of the spaces beneath the respective "B I N G O" letters.

The game card 602*a* may provide for promoting use of dispensers and beverage brands being dispensed. Moreover, the game card 602 may display the numbers 606 that a user seeks to match in response to a qualified pour of the various brands and flavors. The dispensers may display numbers associated with each of the available beverages or may issue a random number in response to a beverage being selected in each of the respective categories. In an embodiment, the game may be offered 2 to 3 months per year for 5 years, and may be conducted about same time each year, thereby causing consumers to anticipate the game. To further improve excitement, each year the game may take on a new twist with more interesting and exciting prizes.

In an embodiment, a electronic communication handshake may occur as the user approaches the vending machine. The vending machine may individually identify the user, thereby allowing for individualized communications optionally based on previous communications. The digital game card 602*a* may be displayed on the mobile device as a reminder, thereby allowing the user to choose a category of beverage that aligns with a bingo category that the user needs to win (i.e., to score a bingo). The consumer may win brand awards or "swag," such as apparel, event tickets, hip merchandise, music downloads, etc. when the has achieved 5 icons in a row vertical, horizontal, or diagonal. Hence, the user may fill in his or her game card 602*a* by pouring qualified beverages in each category and matching numbers associated with each of the categories.

In an embodiment, in order for users to experience a full variety of beverages produced by a manufacturer, the bingo may require consumers to try beverages in the following categories:

Original Sparkling (any flavor selection) (B)
Low or No Calorie Sparkling (I)
Low or No Calorie Still or Fruit (N)
Dasani Sensations (any flavor selection) (G)
Coca-Cola (any flavor selection) (O)

The categories may be mutually exclusive and simple for the consumer to understand how to make such selections on the dispensers. Once the handshake occurs, as the consumer approaches the dispenser, a bingo icon (not shown) that is selectable may appear on a user interface. In an embodiment, the consumer may select the bingo icon, and the user interface may thereafter change to display the game card 602*a* with the B I N G O across the top the spaces 604 and numbers 606 on the game card 602*a* below each letter with the naming of each category. The change of the user interface for participating consumers may draw attention and questions by other non-participating consumers that happen to view and ask about the new entertaining screen that pops up due to the connected handshake between the mobile device and the dispenser.

The promotion may be announced via the mobile application so that any users of the mobile application may be alerted to the availability of the bingo promotion, and each app user may be eligible to participate. Upon agreement to terms and conditions, a digital game card may be downloaded (unless the game card is operated in the "cloud"). The game card may be similar to a normal bingo card, where numbers are filled in a 5×5 matrix with the center being free, in this case shown with a beverage brand icon. As the user selects a beverage on a beverage dispenser, a number may be displayed on the screen and downloaded to the mobile device of the user that is in communication with the dispenser.

If the downloaded number matches a number on the game card 602*a*, the matched number may be highlighted and/or an icon 608 of a beverage brand may be displayed or an icon of the beverage brand that the user selected may be displayed. If the number does not match, the number may be displayed in small font (not shown) below the digital game card 602*a*, where the number may be stored until the end of the game. In an embodiment, the number may be the same for each player during a time period. A set of numbers may be preset prior to the game being initiated, where the set of numbers may be randomly or non-randomly selected. Alternatively, the number may be selected on a real-time basis. Alternative algorithms for selection of the number may be utilized. By issuing a single number each time the user communicates with a beverage dispenser and dispenses a qualified pour, the user may be more motivated to engage and dispense qualified pours more often. Alternative number issuing techniques may be utilized.

In an embodiment, within collections or groups of dispensers, each dispenser may have a pattern of bingo numbers that get revealed upon beverage selections for participating consumers. Alternatively, a server may store the pattern of bingo numbers and the dispenser(s) may request a bingo number as needed. The numbers may be static and remain on the dispenser until the end of the bingo game promotion. This gaming configuration may include multiple subsets within which prizes and points may increase with the number of winning game cards. Below is a set of illustrative examples:

Level 1: 1 game card win: $10 prize
Level 2: 2 game card wins: $50 prize value
Level 3: 3 game card wins: $1000 prize value If the user interacts with a dispenser that is conducting a different bingo game than bingo game(s) that the player is currently playing with different dispensers (e.g., located in different food outlets or geographic locations), then the player may be notified and be allowed to download a new game card or use an existing game card to participate in the bingo game being supported by the dispenser with which the user is engaging at the time. Thereafter, as the player communicates with a dispenser, the mobile app may determine which game card belongs to the bingo game being supported by the dispenser based on an identifier communicated to the mobile device on which the mobile app is operating, and automatically show and populate that game card.

As understood in the art, players are to be of sufficient age to comply with state laws for games of this nature. The game cards may expire after either time or the number of winners has met objectives of the promotion. Over the duration of the promotion, digital game cards may expire, but at the discretion of an operator. Any expiration notice shall be communicated to the user in advance of expiration. A new digital game card may be downloaded upon expiration of the prior card.

One embodiment of a bingo game is to have a maximum number of users who participate to win at least at level 1. In an embodiment, no game cards can win from a single beverage dispenser, thereby motivating the users to seek out and utilize other beverage dispensers that are available to participate in playing the bingo game so that a consumer would not be able to sit in front of a machine and make every selection to get 5 numbers in a row and score a bingo. For example, a consumer would have to visit at least three machines to win. The consumer may be limited to one number per handshake. In such a configuration, selecting another beverage to see and download another number will not happen from that machine on that day or within a certain number of hours (e.g., 4 hours) for the user.

Upon winning at bingo, the consumer may select from a variety of prizes available online through the app and/or promotional website that the user has registered. The consumer may choose to save the points for a later purchase.

The digital handshake may occur after the consumer acknowledges the dispenser ping created by a 3-in-1 connectivity module located within the dispenser. In an embodiment, the handshake may occur when the consumer is within a certain distance, such as about 5 feet, of the dispenser. Alternative distances may also be utilized. Once the handshake is acknowledged, upon a next dispense that starts with a return to the home screen, a bingo icon shall appear. Once the bingo icon is selected by the user, a bingo user interface may be selected or displayed. If the user selects a beverage that provides a number that matches one of the bingo numbers 606 on the game card 602a, then an icon 608 may be displayed in a space within which the matching number is displayed. Alternatively, if the number associated with the dispensed beverage does not match any of the numbers, a message, such as "sorry, no match, but please try again later."

Figure 6B:
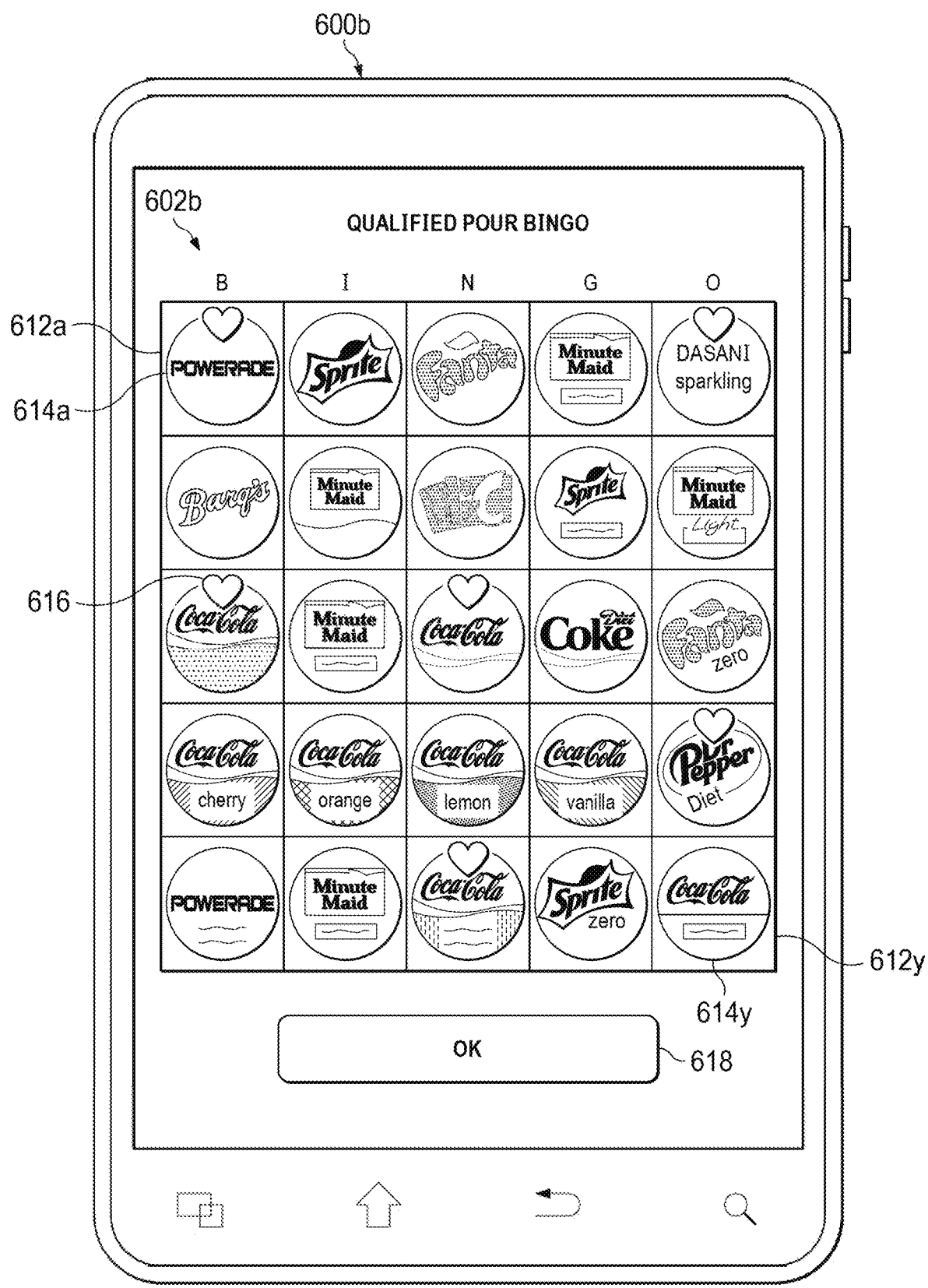

As shown in FIG. 6B, an alternative bingo game card 602b may be displayed. The game card 602b may display spaces 612a-612y within which specific beverage brand icons or logos 614a-614y (collectively 614) may be displayed. The game card 602a may provide for promoting use of dispensers and selecting certain beverage brands to be dispensed to increase brand awareness by the users. Moreover, the game card 602 may display the brand logos 614 in response to a user making a qualified pour of the various brands and flavors. In some cases, the beverage brand logos 614 may include multiple logos, such as shown with beverage brand logo 614y, which to obtain would require a user to perform a qualified pour of a blend of both brands. In an embodiment, the user may select each of the beverages displayed on the game card 602b. A qualified pour of that beverage may or may not earn the user a winning piece indicated by a logo 616, such as a heart. By displaying each of the different beverage brand logos 614a, the user may become familiarized with the many different brands and flavors of those brands available on the dispenser. Each player may have the same or different brand logos 614. As with conventional bingo, if the user is able to get 5 spots Jackpot Promotional Game In another embodiment, a beverage dispenser jackpot promotion may be offered. The beverage dispenser jackpot promotion may create excitement for customers by offering a joint promotion that incents incremental sales for both food outlets and beverage providers for the beverage dispensers. As with the bingo game, the jackpot game may be conducted 2-3 months per year, and may be conducted during the same time each year to help build excitement prior to the game starting.

For a limited time, immediate redemption with quick service restaurants/full-service restaurants (QSR/FSR) (or other food outlet) restaurant menu items may be available to win upon selection of winning beverage brand icons. When a brand icon is selected, the message 708 (FIG. 7B) behind the brand appears with an either "Sorry Try Again on your Next Visit" or a promotional offer "You Just Won! Free Fries" sponsored by the food outlet. The message behind each freestyle brand of prize or no prize (custom promos) may be dynamic. In other words, the message may change between qualified beverage pours so that consumers do not select the same brand and claim the same promotions with the food outlet repetitively. Several wins by the same customer may enable the customer to win a higher level gift from a producer of beverages dispensed on the beverage dispensers.

A mobile device 700 is shown to be displaying a digital game card 702 inclusive of beverage selections, which may shall have a common game card structure with common menu selections. Each game type promotion may have a unique digital game card to enable the consumer (mobile app holder) to keep track of what prizes her or she has won or not won, statistics of play, score, etc. There may also be an accounting of reward points that may be redeemed for gifts. As shown, different beverage brand logos 704a-704e (collectively 704) may be displayed. Although five brand logos 704 are shown, it should be understood that one or more brand logos may be displayed. In an embodiment, the brand logos 704 may be selectable by a user to determine whether he or she has won a prize. In an embodiment, only one of the brand logos 704 may be selected, and a winning or losing message may be displayed. Alternatively, each of the brand logos 704 may be selected and winning or losing messages may be displayed in response to selection of the respective brand logos 704. In an embodiment, the logos 704 may include non-beverage brand logos (e.g., box of French fries) in response to the user purchasing different foods and/or beverages that correspond with logos displayed. If, for example, the user purchases a particular qualifying large sandwich and dispenses a qualifying pour of a beverage, then the game card 702a may be caused to display logos of those qualifying items for selection, and one or more of those logos may include a winner or loser message. If non-beverage logos are displayed, the beverage dispenser may communicate with a point-of-sale (POS) that communicates or makes available a particular order associated with a particular user. If the user elects to not participate, he or she may select a "cancel" soft-button 706.

Prior to or at the beginning of any promotion, the jackpot promotion game may be advertised across all mobile application holders with email, text, and application notices. Each app holder is eligible to participate. In response to opting in, and upon agreement to terms and conditions, a digital game card 700 is downloaded. The digital game card 702a may provide a list of potential prizes by the food outlet, a count of beverages consumed by the user, and prizes won. Users may also be able to rate their favorite beverages and favorite beverage machines using the game card 700.

As with the bingo game, the wireless handshake may occur after the consumer acknowledges the dispenser ping created by the 3-in-1 connectivity module located within the dispenser. This occurs when consumers have the mobile app open and the jackpot game card 700 downloaded. The handshake may occur when the consumer is within about 5 feet or other distance of the dispenser. The handshake may be acknowledged by the consumer as he or she approaches the machine, a jackpot icon may appear on a home screen of a mobile app, and may be selectable for communicating with a dispenser to play.

In response to the jackpot icon being selected, a special jackpot user interface may take over the screen and be displayed, as previously described. The change of the user interface for participating consumers may draw attention and questions by other non-participating consumers with visibility to the screen, which may increase participation of the promotional jackpot game.

Players are to be of a certain age, and all relevant state laws are to be followed by the jackpot game. Digital game cards may expire after either time or the number of winners has met the promotion objectives. Any expiration notice shall be communicated to users a certain number of days in advance of expiration. A new digital game card may be downloaded upon expiration of the prior card.

Each qualified dispenser may have a random pattern of promotions that get revealed upon qualified beverage pours for participating consumers. The promotions may be dynamic (i.e., a winning value may move around behind different brands or icons between pours), and may not be changeable during the promotion period. Promotions may be created by "collection."

Prizes and points may increase with a number of winning game cards. The below reward messaging is illustrative behind beverage brand icons, and may be displayed in response to selecting one or more of the beverage icons 704.
  (i) Winner! Free menu item—today only. Value less than $2 ($4, $6). Redeem with phone barcode download
  (ii) Winner! Free large fries;
  (iii) Winner! Free large fries when you order a large or qualified sandwich;
  (iv) Winner! Free desert;
  (v) Winner! Free desert when you order a super-size meal;
  (vi) Winner! Buy one, get one of equal or lesser value free when you buy an entrée;
  (vii) Winner! Grand Prize token (1 of 5); and
  (viii) Sorry! Please keep playing jackpot to win rewards!

A feature of the game may have a maximum number of users who participate win at least at level 1. Another feature may be set such that no game cards can win a jackpot grand prize from a single machine (e.g., beverage dispenser), which means a consumer would not be able to sit in front of a machine and win the jackpot. For example, a consumer may have to visit at least 5 machines or more to win a grand prize or some subset thereof. The consumer may only get one custom promo award or attempt per handshake. Selecting another beverage to see if another promo is under a different brand will yield no message once the initial promo attempt is revealed. The user may be allowed a second try at X hours, where X may be determined by the food outlet, and may be configurable at the dispenser.

The promotion may be turned off by a manager or operator of a food outlet, such as for reasons including electing not to participate or if for some reason the promotion is not yielding expected results. The odds of winning may be calculated to ensure the cost of the promotion is covered by a margin of the incremental beverage sales and food/menu items expected to be purchased. Upon winning a certain number of times at a certain number of machines, the game card may acknowledge the winning so as to keep the consumer engaged with greater prizes through further play.

Figure 7A:
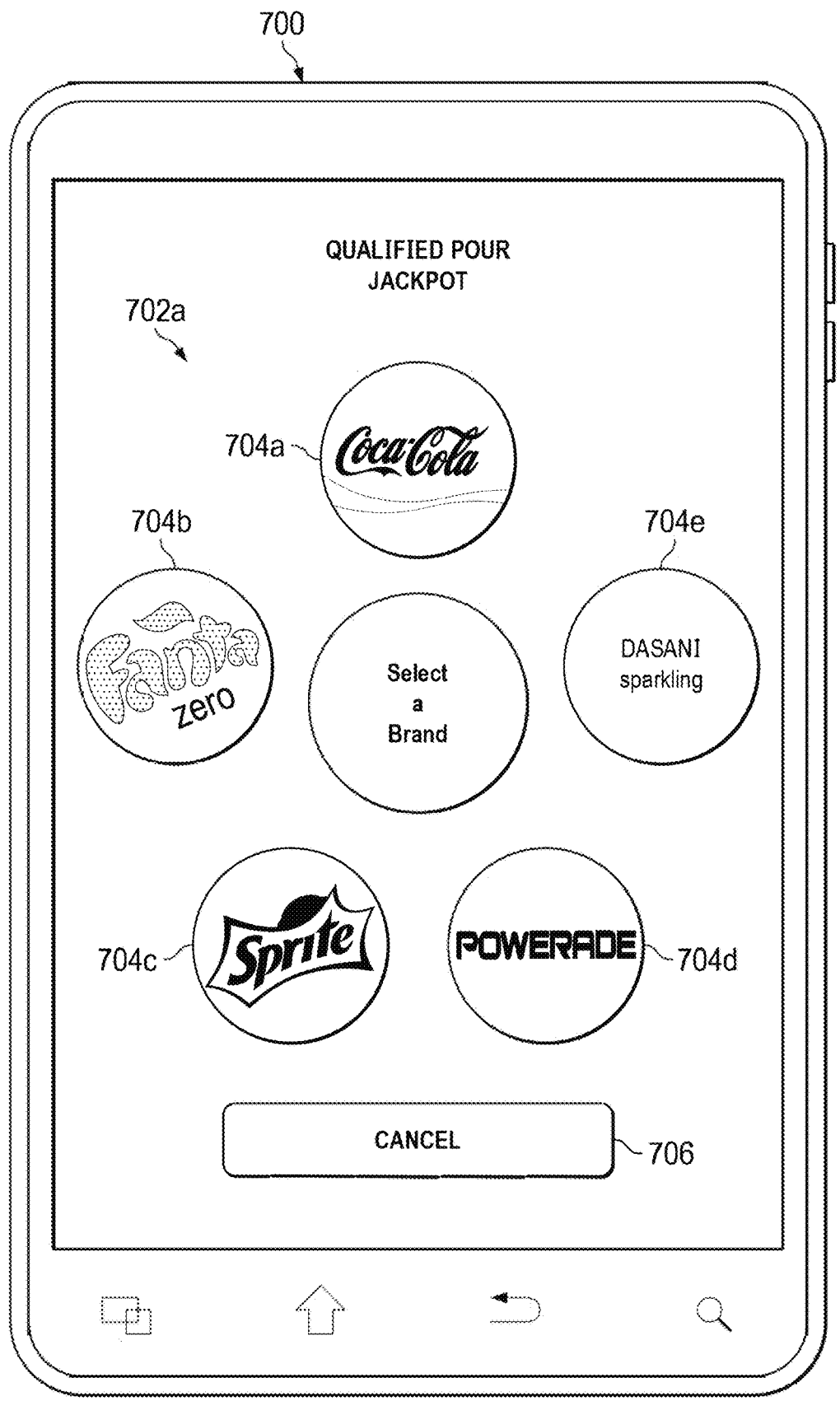
FIGS. 7A and 7B are screenshots of another illustrative game, in this case a jackpot game.
Figure 7B:
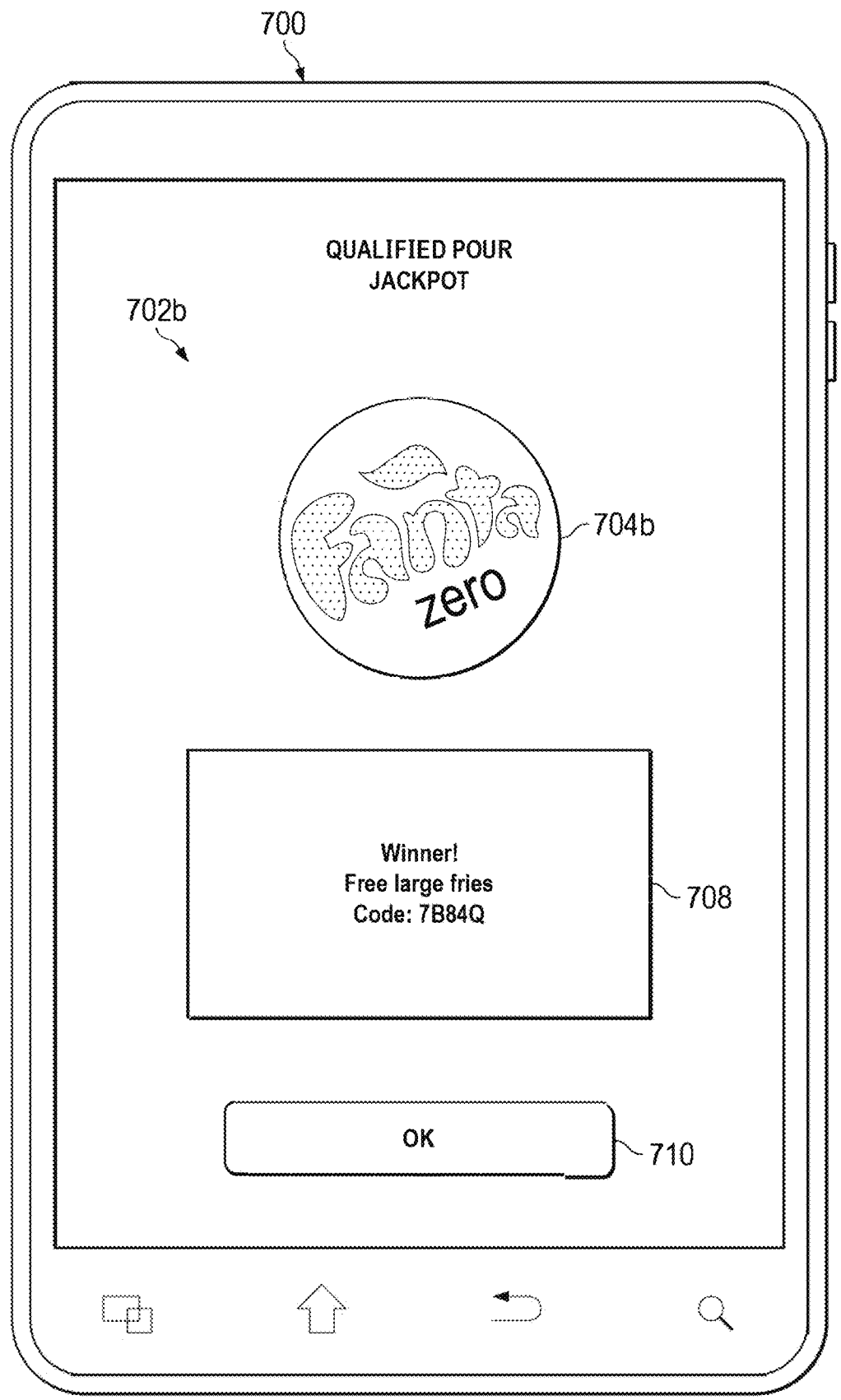

As the participating consumer approaches a dispenser, the handshake may be acknowledged with screen changing to show game card 702a. Once the consumer selects a beverage icon and the promotion is displayed, a reward notice may automatically be downloaded to the jackpot application being executed by the mobile device 700, and be identified on the digital game card 702b, as shown in FIG. 7B. Once viewed, the user may select an "OK" soft-button 710 to return to a homepage (not shown), current rewards screen (not shown), or otherwise of the mobile app.

The winning promotion may be displayed on the mobile device 700, and may then be used to return to the point of sale register to redeem.

A winning promotion code, symbol, message 708 may be displayed for each selected logo (e.g., if 3 are able to be selected, then each may have an associated message), and may be either saved or presented to the register attendant at a current or a future visit. In an embodiment, an expiration may be set to a certain number of days to redeem a reward. For redemption, a code may be typed into or be scanned by a scanner at a register, and once entered, the reward is no longer available for redemption. A register attendant may tap the mobile device 700 to acknowledge the code as the free item is delivered, and the code or reward may disappear or otherwise inactivated to indicate the code as being redeemed and no longer active. Other reward processes may be utilized.

The transaction between the consumer (consumers mobile device) and food outlet (crew member) to redeem a promotion may be captured with a cloud or other server, and be reported to the food outlet to provide an indication of the activity and success of the jackpot promotion game.

It should also be understood that the dispenser may be any other consumable item dispenser or vending machine. As examples, the consumable item dispensers may be candy vending machines, beverage can or bottle vending machines, ice cream dispensers, and so on. A variety of uses of the integrated first and second apps may be supported. For example, businesses, such as movie theaters, retail stores, automobile dealerships, shopping malls, sports venues, amusement parks, or any other location that has beverage dispensers capable of dispensing one or more beverages and, optionally, blended ingredient beverages. Hence, rather than determining qualified beverage pours, qualified consumable and/or non-consumable product dispensing may be determined.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

The invention claimed is:

1. A device comprising:
a processing unit including one or more processors and memory, the processing unit configured to:
receive, via an application executing on the device, beverage composition data of a requested beverage by a user of the device, the beverage composition data including a combination of two or more beverages from a beverage dispenser;
transmit, via a communications network to a server, beverage request data, the beverage request data including the beverage composition data of the requested beverage, and a user identifier of a user requesting the requested beverage, the server transmitting at least a portion of the beverage request data to a dispenser;
receive, via a communications network from the server, a message indicating that a counter value associated with qualified beverage pours associated with the user identifier satisfies a threshold; and
display, by the application, a message indicating a reward responsive to the message.

2. The device of claim 1, wherein the portion of the beverage request data comprises the beverage composition data for dispensing by the dispenser.

3. The device of claim 1, wherein the beverage composition data comprises a proportion of a first beverage with respect to a second beverage of the two or more beverages, and a size of the requested beverage.

4. The device of claim 1, wherein the processing unit is further configured to transmit, via the communications network to the server, a location associated with the device, wherein the server is configured to transmit the portion of the beverage request data to the dispenser based on the dispenser being associated with the location received from the device.

5. The device of claim 1, wherein the processing unit is further configured to display, by the application, a user interface including a plurality of dispensable beverages for selecting the combination.

6. The device of claim 5, wherein the processing unit is further configured to receive, via the user interface, a selection of the two or more beverages from the plurality of dispensable beverages.

7. The device of claim 6, wherein the user interface comprises a first user interface, wherein the processing unit is further configured to:
  display, via the application, a second user interface responsive to receiving the selection of the two or more beverages, the second user interface including a user display element for modifying a relative proportion of the two or more beverages for the requested beverage.

8. The device of claim 6, wherein the user display element comprises a pie chart having divider lines with a graphical element rotatable to define relative percentages to be blended into the requested beverage.

9. A method comprising:
  receiving, via an application executing on a device, beverage composition data of a requested beverage by a user of the device, the beverage composition data including a combination of two or more beverages from a beverage dispenser;
  transmitting, via a communications network to a server, beverage request data, the beverage request data including the beverage composition data of the requested beverage, and a user identifier of a user requesting the requested beverage, the server transmitting at least a portion of the beverage request data to a dispenser;
  receiving, via a communications network from the server, a message indicating that a counter value associated with qualified beverage pours associated with the user identifier satisfies a threshold; and
  displaying, by the application, a message indicating a reward responsive to the message.

10. The method of claim 9, wherein the portion of the beverage request data comprises the beverage composition data for dispensing by the dispenser.

11. The method of claim 9, wherein the beverage composition data comprises a proportion of a first beverage with respect to a second beverage of the two or more beverages, and a size of the requested beverage.

12. The method of claim 9, further comprising transmitting, via the communications network to the server, a location associated with the device, wherein the server is configured to transmit the portion of the beverage request data to the dispenser based on the dispenser being associated with the location received from the device.

13. The method of claim 9, further comprising displaying, by the application, a user interface including a plurality of dispensable beverages for selecting the combination.

14. The method of claim 13, further comprising receiving, via the user interface, a selection of the two or more beverages from the plurality of dispensable beverages.

15. The method of claim 14, wherein the user interface comprises a first user interface, the method further comprising:
  displaying, via the application, a second user interface responsive to receiving the selection of the two or more beverages, the second user interface including a user display element for modifying a relative proportion of the two or more beverages for the requested beverage.

16. The method of claim 15, wherein the user display element comprises a pie chart having divider lines with a graphical element rotatable to define relative percentages to be blended into the requested beverage.

17. A non-transitory computer readable medium storing instructions that, when executed by one or more processors, cause the one or more processors to:
  receive, via an application executing on a device, beverage composition data of a requested beverage by a user of the device, the beverage composition data including a combination of two or more beverages from a beverage dispenser;
  transmit, via a communications network to a server, beverage request data, the beverage request data including the beverage composition data of the requested beverage, and a user identifier of a user requesting the requested beverage, the server transmitting at least a portion of the beverage request data to a dispenser;
  receive, via a communications network from the server, a message indicating that a counter value associated with qualified beverage pours associated with the user identifier satisfies a threshold; and
  display, by the application, a message indicating a reward responsive to the message.

18. The non-transitory computer readable medium of claim 17, wherein the instructions further cause the one or more processors to display, by the application, a user interface including a plurality of dispensable beverages for selecting the combination.

19. The non-transitory computer readable medium of claim 18, wherein the instructions further cause the one or more processors to receive, via the user interface, a selection of the two or more beverages from the plurality of dispensable beverages.

20. The non-transitory computer readable medium of claim 19, wherein the user interface comprises a first user interface, wherein the instructions further cause the one or more processors to:
  display, via the application, a second user interface responsive to receiving the selection of the two or more beverages, the second user interface including a user display element for modifying a relative proportion of the two or more beverages for the requested beverage, the user display element including a pie chart having divider lines with a graphical element rotatable to define relative percentages to be blended into the requested beverage.

* * * * *